(12) United States Patent
Padmanabhan et al.

(10) Patent No.: US 7,296,088 B1
(45) Date of Patent: Nov. 13, 2007

(54) SYSTEM AND METHOD FOR DETERMINING THE GEOGRAPHIC LOCATION OF INTERNET HOSTS

(75) Inventors: Venkata N. Padmanabhan, Bellevue, WA (US); Lakshminarayanan Subramanian, El Cerrito, CA (US)

(73) Assignee: Microsoft Corporation, Redmond, WA (US)

( * ) Notice: Subject to any disclaimer, the term of this patent is extended or adjusted under 35 U.S.C. 154(b) by 1127 days.

(21) Appl. No.: 09/849,662

(22) Filed: May 4, 2001

Related U.S. Application Data

(60) Provisional application No. 60/249,487, filed on Nov. 17, 2000.

(51) Int. Cl.
G06F 15/173 (2006.01)
G06F 15/16 (2006.01)

(52) U.S. Cl. .................. 709/238; 709/239; 709/241

(58) Field of Classification Search .................. None
See application file for complete search history.

(56) References Cited

U.S. PATENT DOCUMENTS

| | | | | |
|---|---|---|---|---|
| 4,891,761 A * | 1/1990 | Gray et al. | .................. | 701/219 |
| 5,515,062 A * | 5/1996 | Maine et al. | ................ | 342/457 |
| 6,012,096 A * | 1/2000 | Link et al. | .................. | 709/233 |
| 6,356,842 B1 * | 3/2002 | Intriligator et al. | ............ | 702/3 |
| 6,684,250 B2 * | 1/2004 | Anderson et al. | ........... | 709/225 |
| 6,778,524 B1 * | 8/2004 | Augart | ........................ | 370/351 |
| 6,804,624 B2 * | 10/2004 | Silverman | ................... | 702/159 |
| 6,922,417 B2 * | 7/2005 | Vanlint | ........................ | 370/503 |
| 6,981,055 B1 * | 12/2005 | Ahuja et al. | ................. | 709/238 |
| 2002/0073231 A1 * | 6/2002 | Quarterman et al. | ........ | 709/238 |
| 2002/0078233 A1 * | 6/2002 | Biliris et al. | ................. | 709/238 |
| 2003/0095069 A1 * | 5/2003 | Stilp | .......................... | 342/465 |

OTHER PUBLICATIONS

U.S. Appl. No. 60/241,776.*
U.S. Appl. No. 60/194,761.*
Imielinski, T., et al.; "DataSpace: Querying and Monitoring Deeply Networked Collections in Physical Space", IEEE Personal Communications, vol. 7, No. 5, Oct. 2000, p. 4-9.
David Moore, et al.; *"Where in the World is netgeo.caida.org?"*, http://www.caida.org/outreach/papers/inet_netgeo/, Viewed Jan. 2, 2001, p. 1-14.
*Quova: Our Service*, http:www.quova.com/service.html, Viewed Jan. 2, 2001, p. 1-3.
*VisualRoute, Datametrics System Corporation*, http://www.visualroute.com, Viewed Jan. 2, 2001, p. 1-2.
*VisualRoute, Technical Notes-Version 5.0b*, http://www.visualroute.com/technotes.html, Viewed Jan. 2, 2001, p. 1-5.

(Continued)

Primary Examiner—Nathan J. Flynn
Assistant Examiner—Ashok Patel
(74) Attorney, Agent, or Firm—Amin, Turocy & Calvin, LLP

(57) ABSTRACT

A system and methodologies are disclosed for determining the geographic location of an Internet host. A first method infers host location based on the DNS names of the host of interest or other nearby network nodes. A second method employs network delay measurements from geographically distributed locations to triangulate the coordinates of the host. A third method couples partial host-to-location mapping information obtained from one or more sources with BGP or other routing information in order to infer location of the host of interest.

41 Claims, 13 Drawing Sheets

OTHER PUBLICATIONS

*AllWhois*, http://www.allwhois.com/cgi-bin/allwhois4.cgi, Viewed Nov. 14, 2000, p. 1-2.
*Akamai, Inc.*; http://www.akamai.com, Viewed Nov. 14, 2000, p. 1.
*Akamai Advantage, Inc.*; http://www.akamai.com/html/aa/index.html, Viewed Nov. 14, 2000, p. 1.
*Akamai Network, Inc.*; http://www.akamia.com/html/aa/akne.html, Viewed Nov. 14, 2000, p. 1-2.
*The CAIDA Web Site*; httl://www.caida.org, Viewed Nov. 14, 2000, p. 1.
*Topology-CAIDA: Analysis: topology*; http://www.caida.org/analysis/topology, Viewed Nov. 14, 2000, p. 1-2.
*Tools-CAIDA: TOOLS*; http://www.caida.org/tools, Viewed Nov. 14, 2000, p. 1.
*Education and Outreach-CAIDA:OUTREACH*; http://www.caida.org/outreach, Viewed Nov. 14, 2000, p. 1-2.
*NetBoy Suite: Complete Netboy Package of Appliations*; http://www.ndgsoftware.com/~ndgabout/page3.html, Viewed Nov. 14, 2000, p. 1-3.
*NeoWorx Inc.*, http://www.neoworx.com, Viewed Nov. 14, 2000, p. 1-3.
*NeoTrace: Graphical Trace Route Program*; http://www.neoworx.com/products/neotrace, Viewed Nov. 14, 2000, p. 1-2.
"e-Business Without Limits";*Digital Island, Inc.*; http://www.digitalisland.net/services, Viewed Nov. 14, 2000, p. 1-2.
*VisualRoute: Mapping the Internet*; http://www.visualroute.com, Viewed Nov. 14, 2000, p. 1-2.
*U.S. Census Bureau: United States Department of Commerce*; http://www.census.gov, Viewed Nov. 14, 2000, p. 1-2.
Sutton, J.C., et al., "Dynamic Location: An Iconic Model to Synchronize Temporal and Spatial Transportation Data", *Transportation Research Part C (Emerging Technologies)*, vol. 8C, No. 1-6, Feb.-Dec. 2000, p. 37-52.
"A Geographic XML-based Format for the Mobile Environment"; Artem Garmash; Proceedings of the 34th Hawaii International Conference on System Sciences—2001; pp. 1-9.
V. N. Padmanabhan, et al., Determining the Geographic Location of Internet Hosts, Nov. 2000, pp. 1-15, MBR—TR—2000-110.

\* cited by examiner

SYSTEM AND METHOD FOR DETERMINING THE GEOGRAPHIC LOCATION OF INTERNET HOSTS

CROSS REFERENCE TO RELATED APPLICATION

This application claims the benefit of U.S. Provisional Patent Application Ser. No. 60/249,487, which was filed Nov. 17, 2000, entitled SYSTEM AND METHOD FOR DETERMINING THE GEOGRAPHIC LOCATION OF INTERNET HOSTS.

TECHNICAL FIELD

The present invention relates generally to computer systems, and more particularly to methods and systems for determining the geographic location of Internet hosts.

BACKGROUND

Location-aware computing provides a user with a computing experience tailored to the user's geographical location. Location-aware computing enables users to interact effectively with their environment, by making computing a function of the user's location as well as other factors. Both the behavior and the user interface of software applications may be modified according to the user's location via the employment of location-aware computing techniques. For example, a printing service may route a user print job based on which printer is located nearest the user's current location. In another example, a restaurant location service or application may preferentially locate or select restaurants that are close to the user's location.

Location-aware computing is also relevant for the more traditional Internet hosts, such as user desktop machines, which are typically stationary and are commonly connected via a fixed wireline network. Consider, for example, a user browsing information on a news Web site. There are many ways in which the information delivered to such a user can be customized according to his or her physical location. For instance, the user may be sent information on local events, weather, and the like. In addition, advertisements may be targeted based on the geographical location of the Internet host. The Web site can also monitor usage and/or control access to content based on client location (this in analogous to viewership ratings and broadcast rights in the context of traditional TV).

Knowing or estimating the physical location of the user is a prerequisite for location-aware computing. The granularity of location information needed may vary depending on the application. Thusfar, much work has gone into determining user location in the context of wireless networks and mobile hosts, for example, a cellular phone user driving around a city. A variety of approaches have been used for determining user/host location in a wireless setting. For instance, location inferences have been obtained based on wireless signal timing and/or signal strength, based on a particular mobile host's point of attachment in a cellular network, or by using a Global Positioning System (GPS). However, the signal strength measurement techniques employed in wireless systems are not applicable to the Internet.

While various techniques have thusfar been developed for wireless or mobile clients, such as cell phones and the like, conventional tools and techniques for locating Internet hosts have not similarly progressed. Thus, while some such tools are available, these remain generally inadequate to provide the geographic resolution required to facilitate improved location-aware computing applications and services. For instance, it is possible for a Web site to determine a user's Internet host location by requiring the user to register with the site and then "log in" each time he or she visits the site. While such a mechanism may be appropriate for services with high security requirements (such as banking and email), it is impractical to expect users of the vast majority of Web sites (such as news sites that users browse casually) to register and log in.

An alternative to requiring users to "log in" or register, is to store location information in a client-based cookie at the time of registration, and to then include the cookie in future requests. Such an approach does not require the user to log in on each visit, but it still imposes the burden of registration. Moreover, the cookie information may be unavailable when the user connects from a host other than the one from which registration was performed. In either of these techniques, the location information manually input by an individual user may be inaccurate or erroneous. Thus, the value of such information is questionable, with respect to providing a computing experience customized according to location.

There has recently been an interest in location-aware computing and services in wireless environments. As a result there has been much work on the problem of locating hosts in such environments. The most well-known among these is the Global Positioning System (GPS). However, GPS is ineffective indoors. There have been several systems targeted specifically at indoor environments. However, in general these techniques are specific to wireless networks and are thus not applicable to the Internet.

Some attempts have been made to provide services for mapping IP addresses to geographic locations. Thusfar, however, no satisfactory solution has been found. Conventional proposals for solving the Internet host identification problem can be broadly classified into three categories; domain name service approaches, whois based approaches, and traceroute approaches.

The first approach includes incorporating latitude and longitude information in the domain name service (DNS). This may include defining the format of a new resource record (RR) for the domain name system, and reserving a corresponding DNS type mnemonic (e.g., LOC) and numerical code (e.g., 29). However, existing DNS based approaches suffer from several problems. First, this approach involves modification of the record structure of DNS records. Also, the DNS approach requires different administrations to enter the LOC records into the DNS record database, which may be a burdensome task. Furthermore, there is no easy way to verify whether the location entered by a user or administrator is correct and trustworthy.

Another approach involves using the whois database to determine the location of the organization to which an IP address was allocated. The whois utility is used to query a host and determine if a certain user is registered on that system. Some conventional tools query whois servers to attempt to ascertain the geographic location of a host. However, several problems exist with whois based approaches. For example, the whois database is highly unreliable. The organizations that maintain the domain name data do not insist on keeping the database accurate and current. Thus, records corresponding to an IP address block may be present in multiple registries, but these records may not be consistent.

In addition, a large block of IP addresses may be allocated to a single entity. Thus, for any IP address in that block, the whois server will return only the headquarters or the address registered by the organization. For example, the 8.0.0.0/8 IP address block is allocated to BBN Planet and a query to a whois database may only return "Cambridge, Mass." for any IP address within this range. A further problem is that due to web-hosting and domain name transfers, the location registered in the whois database may be very different from the actual location of host server. For example, a whois query on www.desktop.com may return the location as Colorado, even though the servers are actually based in San Francisco.

A third approach involves performing a traceroute function to an IP address and mapping the router label to the geographic location using airport codes, city codes and country codes. Traceroute is a utility that traces the route from a client machine to a remote host being contacted, and reports IP addresses of routers in between. The basic idea in any traceroute-based tool is to perform a traceroute from a source to a given IP address and look at the router labels (e.g., the DNS names associated with a router's network interfaces) along the path. The router labels may have the geographic location information hidden in terms of city codes, airport codes and country codes. However, traceroute-based approaches suffer from several shortcomings. First, router label information may not be available for several reasons: the router may not respond to the packets sent by traceroute or the IP address of the router interface may not resolve to a DNS name. Second, the location information contained in the router label may be ambiguous. Each ISP has its own naming scheme for cities, which makes it difficult to decipher location. For example, the codes used for San Francisco, Calif. include sfo, sffca, sanfrancisco, sanfranciscosfd, snfr, and snfrca. City names may be ambiguous. For example, there are well over a dozen different locations called Bloomington in the United States, so the presence of the code bloomington in a router label does not indicate the actual location. Even airport codes may cause ambiguity. For example, mit is the airport code for Shafter, Calif., but it also appears in router labels associated with MIT in Cambridge, Mass.

A fundamental problem with using IP address to estimate location, in general, is that many clients are behind firewalls or proxies, so the "client" IP address seen by the server may actually correspond to the firewall or the proxy. Thus, geographic location is traceable only to the proxy location, which may be quite far from the location of the client. Existing techniques based on DNS, whois, or traceroutes are unable to tell when a "client" IP address actually corresponds to a proxy. So they would use the proxy's IP address to estimate location not realizing the error. As a result of the incorrect location estimate, a location-aware computing system may provide the user with inappropriate information or content.

In summary, the limitations of existing techniques points to the need for improved systems and methodologies by which the geographic location of Internet hosts may be determined.

SUMMARY

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention provides methodologies and software tools for determining the geographic location of Internet hosts, which achieve improved location accuracy over that of conventional techniques. In particular, the invention comprises software tools and methodologies, referred to hereinafter as GeoTrack, GeoPing, and GeoCluster, for determining the geographic location of Internet hosts. The GeoTrack tool infers location based on the DNS names of the host of interest or other nearby network nodes. The GeoPing tool correlates network delay measurements from geographically distributed locations to triangulate the coordinates of the host. The GeoCluster tool couples partial host-to-location mapping information obtained from one or more sources with routing information in order to infer location of the host of interest.

The invention finds utility in many situations, such as where Internet servers try to deduce the location of clients without depending on explicit information from the human user or the client ISP. Thus, the tools and methodologies of the present invention determine the geographic location of the user knowing only the IP address of the Internet host from which the user is connecting. The novel techniques of the invention approach this problem from different angles by employing one or more different properties of the Internet, such as hierarchical addressing and correlation between delay and distance.

The first methodology, GeoTrack, operates to infer Internet host locations based on the DNS names of the host of interest or other nearby network nodes. This method employs traceroute and PING measurements from multiple sources to the specified IP address of the host, and converts the router labels into geographical locations using city codes, country codes, airport codes, and the like. The DNS name of an Internet host sometimes contains clues about the location of the host. Such a clue, when present, may indicate the location at different levels of granularity such as city (e.g., corerouter1.SanFrancisco.cw.net may indicate the city of San Francisco, Calif.), state/region (e.g., www.state.ca.us may indicate the state of California,), or country (e.g., www.un.cm may indicate the country of Cameroon).

Even when present, however, the clue could be misleading (e.g., a host with a DNS name www.newyork.com may actually be located in the city of New Orleans). Thus, the GeoTrack method selectively employs such clues to overcome or minimize the problems associated with prior DNS based approaches. For instance, the GeoTrack method may employ a subset of airport codes, wherein misleading airport codes have been removed. In addition, other specialized lists of city and country codes may also be employed, wherein the city codes may be partitioned based on country and/or continent. This allows the proper partition to be employed according to other network information.

If the traceroute initiated from one location fails because it encounters routers whose labels do not contain meaning location information, then the traceroutes from other geographically dispersed locations may still succeed because these are likely to encounter a different set of routers. Thus, GeoTrack employs a plurality of traceroutes initiated from geographically dispersed locations, whereby more refined location estimates are obtained and the likelihood of obtaining a location estimate is improved.

According to an aspect of the present invention, there is provided a method of determining the location of an Internet host using a first computer system, which comprises obtaining route information relating to a first network path between a host IP address associated with the Internet host and the first computer system. The first network path comprises the first computer system, the Internet host, and one or more intermediate network nodes. In addition, the route information may comprise a plurality of router labels associated with the host IP address and the intermediate network nodes. The method further comprises extracting a first location code from the route information corresponding to a router label associated with the Internet host or an intermediate network node proximate the Internet host, and consulting a data store comprising at least one data set having location codes and corresponding location information. The method further comprises obtaining location information from the data store corresponding to the first location code associated with the Internet host or the proximate intermediate network node, and providing a first location estimate of the location of the Internet host according to the location information from the data store corresponding to the first location code.

The second method, GeoPing, employs network delay measurements made from geographically distributed locations to triangulate the coordinates of the host. This method thus employs the functional relationship between the delay experienced by packets traveling between a pair of hosts in the network and the geographic separation between the hosts. The delay measurements are correlated with a database or other data store having delay measurements between known sources and locations, in order to provide an estimate of the Internet host location of interest. For instance, a set of delay measurements made from geographically distributed locations may be used to form a delay vector. The measured delay vector may then be compared with existing delay vectors corresponding to known locations (e.g., as recorded in a delay map). The location corresponding to the closest delay vector may then be used as the location estimate. Alternatively or in combination, the locations corresponding with two or more known delay vectors close to the measured delay vector may be triangulated to derive a location estimate for the host of interest.

According to another aspect of the invention, there is provided a method of determining the location of an Internet host using a first computer system, which comprises measuring a first delay time relating to a first network path between a target host and the first computer system, measuring a second delay time relating to a second network path between the target host and a second computer system, and measuring a third delay time relating to a third network path between the target host and a third computer system. The method may include measuring any plurality of such delay times. In addition, the method provides for correlating the first, second, and third delay times, and providing a location estimate of the location of the Internet host according to the correlation of the first, second, and third delay times. For example, the correlation may comprise creating a delay vector using the measured delay times, and comparing the resulting measured delay vector with known delay vectors. The location estimate may be provided, for instance, by selecting the location of a known delay vector closest to the measured delay vector, and/or by triangulating the locations of a plurality of known delay vectors close to the measured delay vector.

The third method, GeoCluster, couples partial host-to-location mapping information obtained from one or more sources with BGP or other routing information in order to infer the location of the host of interest. Network prefix information extracted from the routing data, in this regard, may indicate clusters of IP addresses that are likely to correspond to hosts that are collocated. For example, the host-to-location mapping information may be obtained from a variety of sources, including web-based email sites, business web hosting sites, TV listing sites, and the like. The host-to-location mapping information thus obtained is partial in the sense that it may include a relatively small number of IP addresses. Moreover, the mapping information may not be entirely accurate (for example, location information in users registration records at a Web-based email site may be stale or incorrect). BGP or other routing information is then employed to expand the coverage of this data by identifying clusters of IP addresses that are likely to be located in the same geographic area.

According to still another aspect of the invention, there is provided a method of determining the location of an Internet host using a first computer system, which comprises obtaining partial IP-to-location mapping information from a data source and network routing information, clustering together IP addresses corresponding to hosts likely to be in the same geographic location according to the network routing information to obtain cluster information, correlating the partial IP-to-location information with the cluster information, and providing a location estimate of the location of the Internet host according to the correlation of the partial IP-to-location information and the cluster information.

The above methods may further comprise some measure of self-calibration, which may include the provision of confidence metrics. Thus, a location-aware system or application may selectively provide location specific services or content according to the estimated Internet host location if the confidence is above a threshold, and not provide such content or services otherwise. In this manner, the methodologies of the invention further prevent or minimize the provision of incorrect location-specific content or services. The invention also provides for combinations of two or more of the GeoTrack, GeoPing, and GeoCluster methodologies.

The invention further comprises software tools and computer-readable media with computer-executable instructions for performing the various methodologies illustrated and described herein. In addition, the invention comprises systems, such as computer systems, adapted to perform Internet host location estimation. The invention further provides geographical location estimate data associated with an Internet host resulting from the above mentioned methodologies and processes.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION

Figure 1:
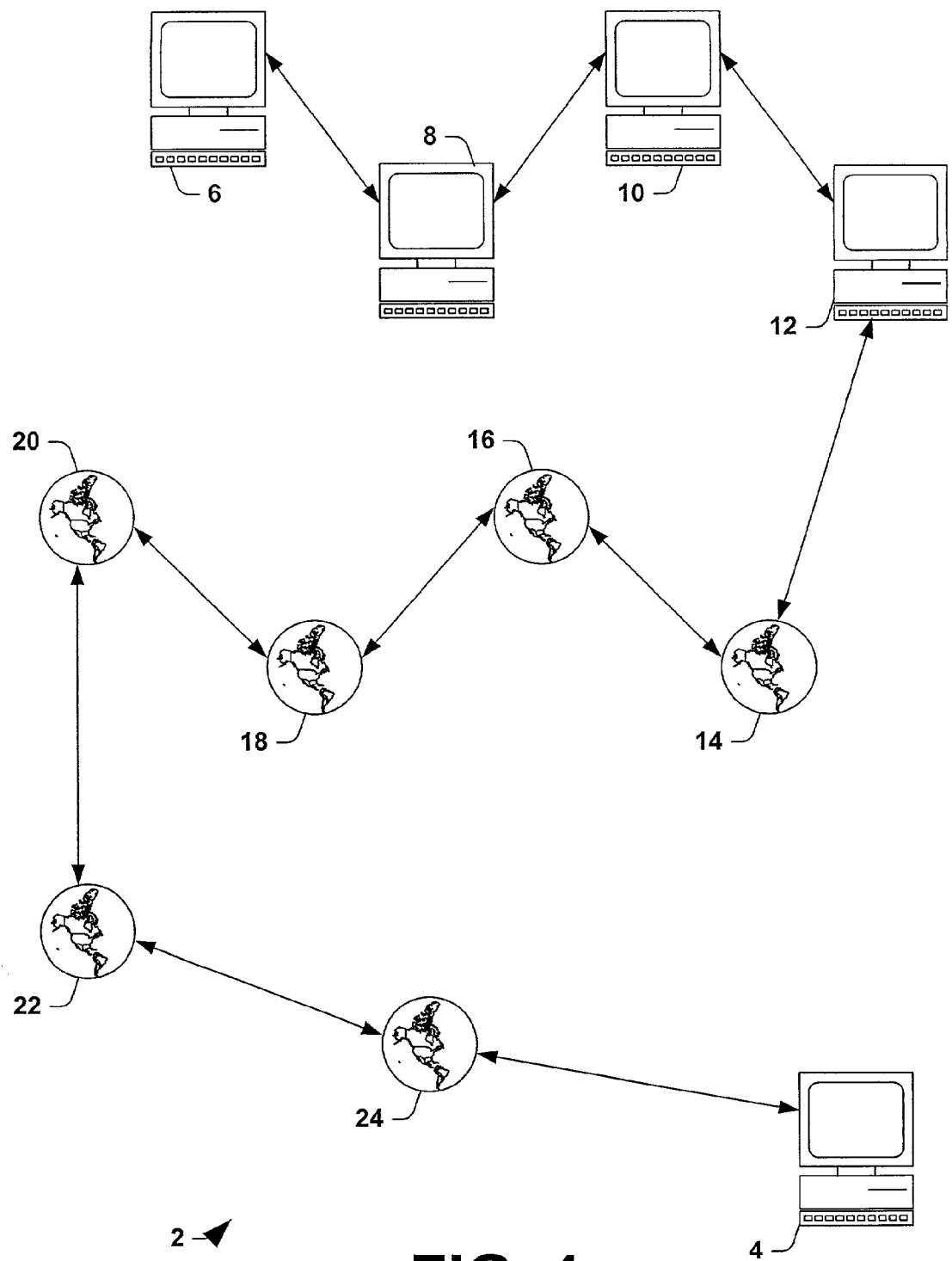
FIG. 1 is a schematic diagram illustrating an exemplary network path between an Internet host IP address and a computer system.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, to one skilled in the art that the present invention may be practiced without these specific details. Moreover, well-known structures and devices are illustrated in some instances in block diagram form in order to facilitate description of the present invention.

The invention provides systems and methodologies for determining the geographic location of an Internet host. A first method infers host location based on the DNS names of the host of interest or other nearby network nodes. A second method employs network delay measurements from geographically distributed locations to triangulate the coordinates of the host. A third method couples partial host-to-location mapping information obtained from one or more sources with BGP or other routing information in order to infer location of the host of interest.

FIG. 1 illustrates an exemplary network path 2 between an Internet host 4 having an IP address (not shown) and a computer system 6. The path may comprise connections between a plurality of intermediate network nodes 8, 10, 12, 14, 16, 18, 20, 22, and 24, which may include other computer systems, routers, networks, and the like. Each such intermediate network node has a unique IP address associated therewith. The path 2 provides a route for transferring data packets (not shown) between the host 4 and the computer system 6. Many such paths may exist between the host 4 and the system 6. In addition, other such network paths may exist between the host 4 and other computer systems (not shown). The exemplary network path 2, like other such Internet connection paths, may but need not be directly related to the geographical separation between the host 4 and the computer system 6.

In order to provide location-aware computing in applications or other services, it is desirable to identify the geographic location of the Internet host 4. Often, however, only the IP address of the host 4 is known to the computer system 6. The invention provides methods and tools for estimating the location of the host 4 knowing only the IP address thereof. The invention thereby facilitates such location-aware computing, such that location specific content or services may be provided to a user of the Internet host 4 without the user having to identify himself/herself or manually specify his/her location (by registering with or otherwise "logging in" to services or applications associated with the computer system 6).

Figure 2:
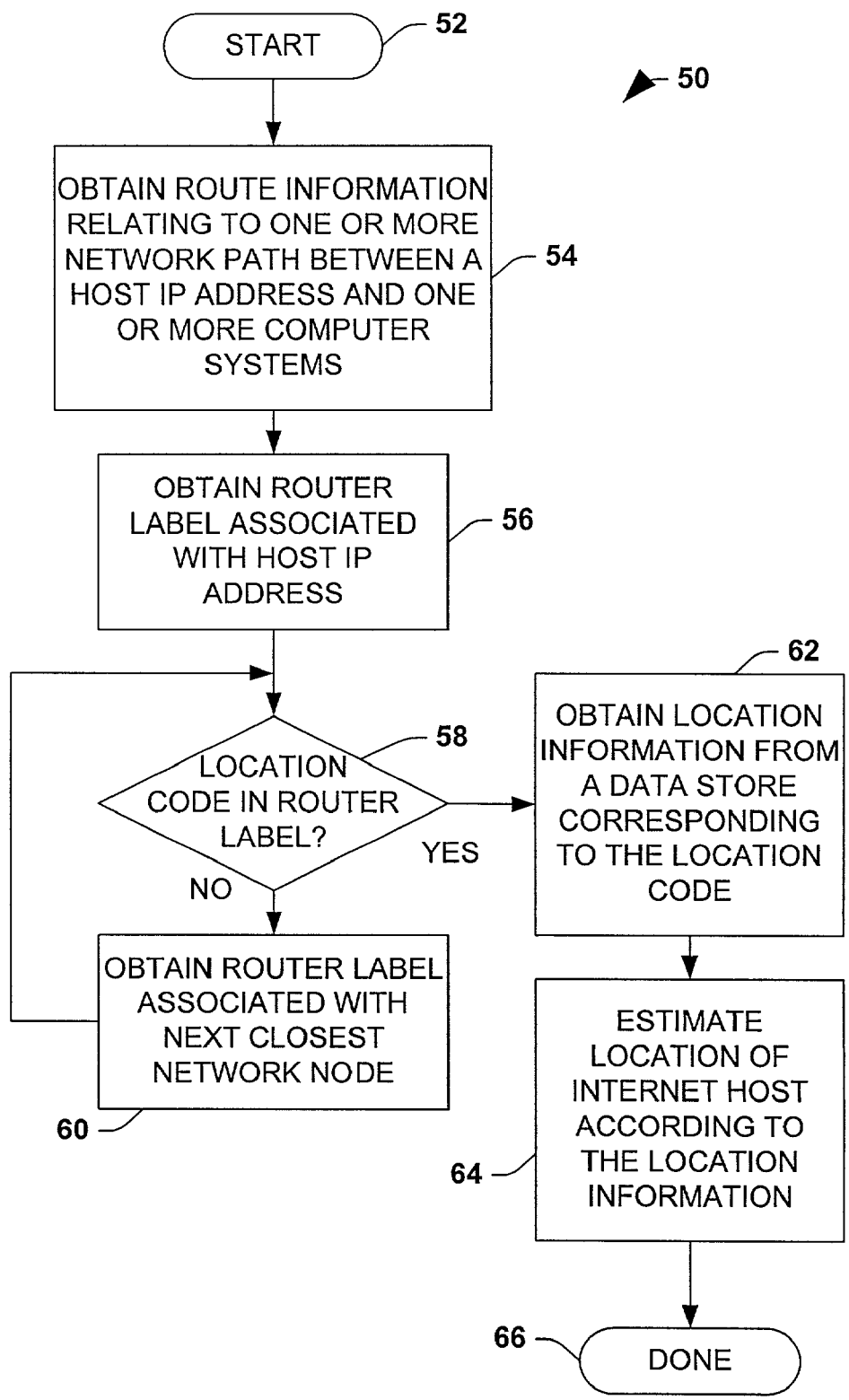
FIG. 2 is a flow diagram illustrating an exemplary GeoTrack method of determining the location of an Internet host in accordance with an aspect of the present invention.

Referring also to FIG. 2, an exemplary method 50, referred to herein as GeoTrack, is illustrated for determining the location of an Internet host (e.g., host 4) in accordance with an aspect of the invention. Although the method 50 is illustrated and described herein as a series of blocks representative of various events and/or acts, it will be appreciated that the present invention is not limited by the illustrated ordering of such blocks, as some blocks may occur in different orders and/or concurrently with other acts or events apart from that illustrated and described herein, in accordance with the invention. In addition, not all illustrated blocks may be required to implement a methodology in accordance with the present invention. Moreover, it will be appreciated that the exemplary method 50 may be implemented in association with the apparatus and systems illustrated and described herein as well as in association with other systems not illustrated.

Beginning at block 52, the exemplary method 50 comprises obtaining route information relating to one or more network paths between a host IP address associated with the Internet host and one or more computer systems at block 54. One such network path may comprise the computer system (e.g. computer system 6), the Internet host (e.g., host 4), and one or more intermediate network nodes (e.g., nodes 8-24) therebetween. The route information may include router labels associated with one or more of the host IP address and the intermediate network nodes.

Thereafter at blocks 56-60, the method 50 comprises extracting a location code from the route information corresponding to a router label associated with one of the Internet host and an intermediate network node proximate the Internet host. At block 56, the router label associated with the host IP address is obtained and a determination is made at block 58 as to whether a location code exists in the router label. For example, the router label may include a city code, country code, an airport code, or the like, from which location information may be obtained. If no such discernable location code is found at block 58, the router label for the next closest network node (e.g., intermediate network node 24) is obtained at block 60, and the method 50 returns to block 58.

This router label is then scrutinized at block 58 to determine whether a useable location code is present therein. If not, the process is repeated through blocks 58 and 60 until the closest intermediate node to the Internet host (e.g., host 4) having a useable location code in its corresponding router label is identified at block 58. Thereafter a data store is consulted at block 62, which comprises one or more data sets having location codes and corresponding location information. Location information is obtained from the data store corresponding to the location code identified at block 58 (e.g., which is associated with the Internet host or the proximate intermediate network node. At block 64, a location estimate is provided of the location of the Internet host according to the location information from the data store corresponding to the location code, whereafter the method 50 ends at block 66.

The location estimate thus provided at block 64 may be corrected or improved, for example, using a measured delay time associated with the network path. In addition, the GeoTrack method may further comprise determining a confidence metric representative of the accuracy of the first location estimate according to the delay time. This confidence metric may be used, for example, by a location-aware application or service to selectively provide or suppress location specific content or services. In this manner, the invention reduces the likelihood that content related to a first location is inadvertently provided to a host in another location.

The GeoTrack method, moreover, may be further supplemented or improved by obtaining second route information relating to a second network path (e.g., other than path 2) between the host IP address (e.g., host 4) and a second computer system (not shown). A second location code may thus be extracted or obtained from second route information corresponding to a router label associated with one of the Internet host and a second intermediate network node proximate the Internet host. From this, a second corresponding location information may be obtained from the data store, and a second location estimate may be provided. The GeoTrack method may accordingly comprise correlating the first and second location estimates to provide an improved location estimate of the location of the Internet host.

The GeoTrack method may be employed in a tool for tracing the geographic location of an IP address. An exemplary implementation of such a GeoTrack tool is described hereinafter, together with examples of test results associated therewith, in order to illustrate various aspects of the invention. The exemplary GeoTrack implementation employs traceroute and packet Internet groper (PING) measurements from a given source (e.g., computer system 6 of FIG. 1) to the specified IP address (e.g., associated with the Internet host 4). The router labels obtained from these measurements may be converted into a geographic location using city codes, airport codes, country codes, and the like. GeoTrack determines the location of the routers based on router labels and returns the location of the router closest to the destination which is recognizable as the location of the Internet host of interest. The GeoTrack tool may thereby provide a reasonable estimate of the location in the U.S., Canada, and 26 different countries in Europe, as well as other locations around the world. For instance, the tool may decipher a router location to a country granularity, based on the country codes for other countries.

Several characteristic features of the GeoTrack methodology differentiate GeoTrack from existing traceroute based tools. For example, the method does not employ the whois databases, due to the above mentioned limitations thereof. In addition, the GeoTrack method may selectively employ location codes according to their actual usefulness, to thereby avoid or minimize the use of misleading location code information. For example, the total number of airport codes is very large. In the U.S. alone, the number of airport codes is estimated as 2,722. Often an airport code might inadvertently appear in a router label. For example, MIT refers to an airport in Shafter, Calif., but also appears in many router labels in the mit.edu domain located in Cambridge, Mass. In the exemplary GeoTrack implementation, the airport code database has been pruned to a much smaller data set, wherein only the more reliable codes are used. In addition, the inventors have found from traceroute logs that many ISPs outside the United States do not use airport codes for naming routers. The list of airport codes may accordingly be restricted to just the United States. The implementation further comprises a city code database with a list of city codes for a number of cities in the U.S., Canada, and 26 countries in Europe. To infer the different codes associated with a city, the implementation performs traceroutes to several web sites in the city from multiple traceroute servers.

The city codes may also be partitioned to further improve performance of the tool. For instance, in order to reduce the chances of an inadvertent match between city codes and common substrings present in router labels, the city codes may be partitioned based on the country and the continent. In this regard, the tool may employ information about the network to decide which partition of codes should be used to infer the location of a router or host. In addition, GeoTrack tools may employ delay-based corrections. For instance, a delay based correction mechanism may be used to remove incorrect guesses of geographic location. If the difference in minimum delays to two adjacent routers is very small (e.g., less than 5 ms) then they may be presumed to be very close to each other geographically.

Figure 3:
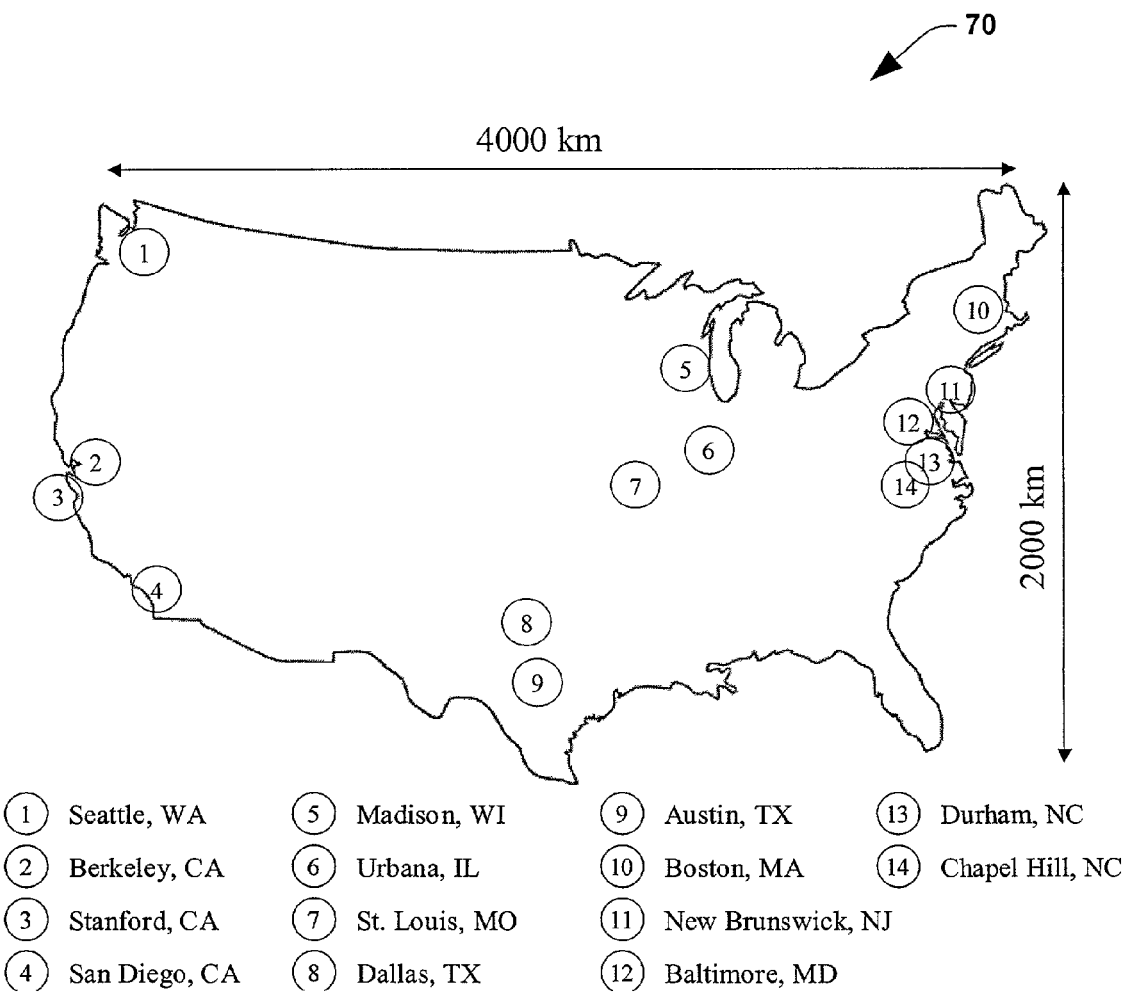
FIG. 3 is a schematic diagram illustrating an exemplary set of geographically dispersed probe locations.
Figure 4:
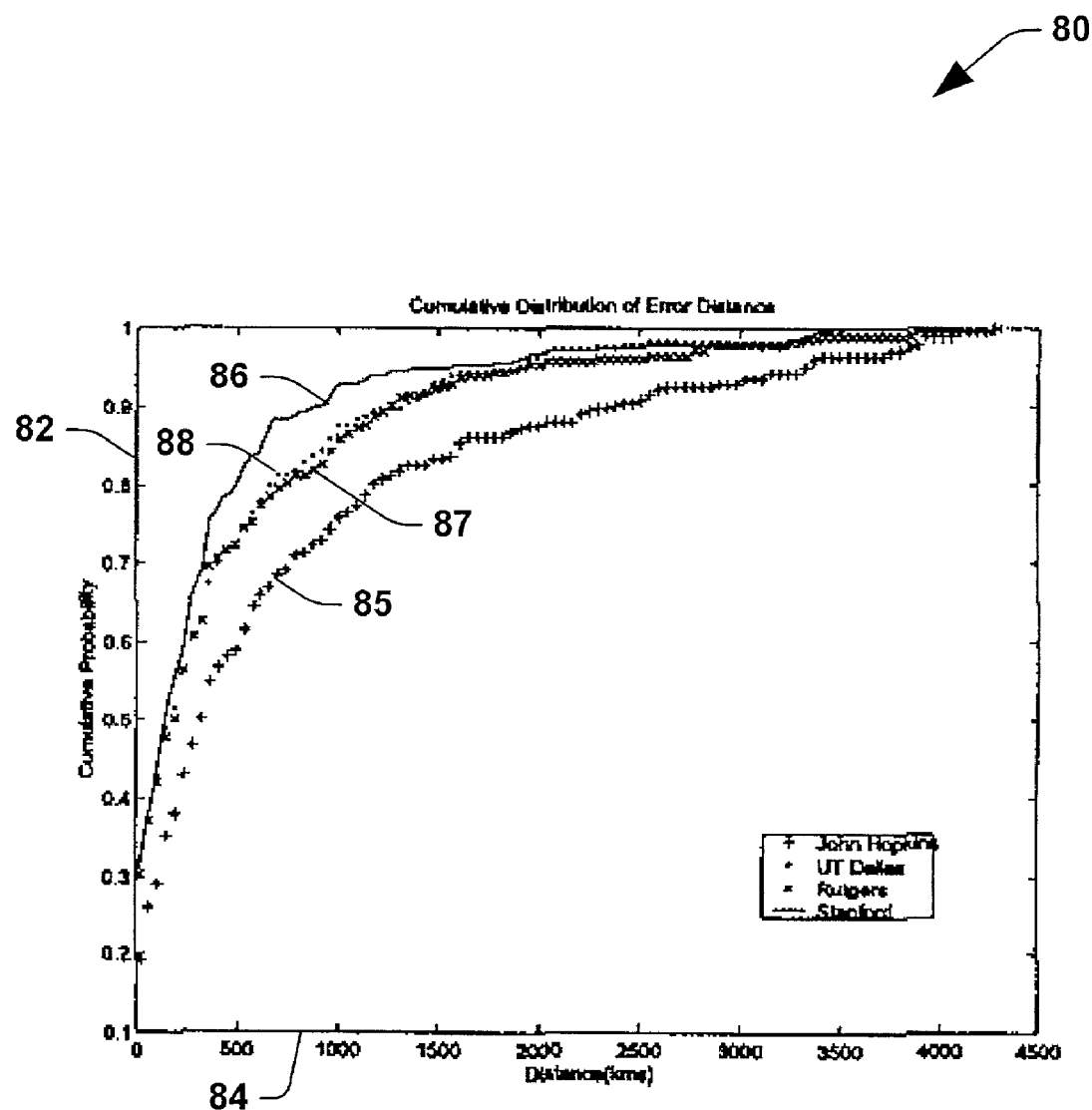
FIG. 4 is an illustration of exemplary cumulative distribution of error distance results obtained via an exemplary GeoTrack method according to an aspect of the invention.
Figure 5:
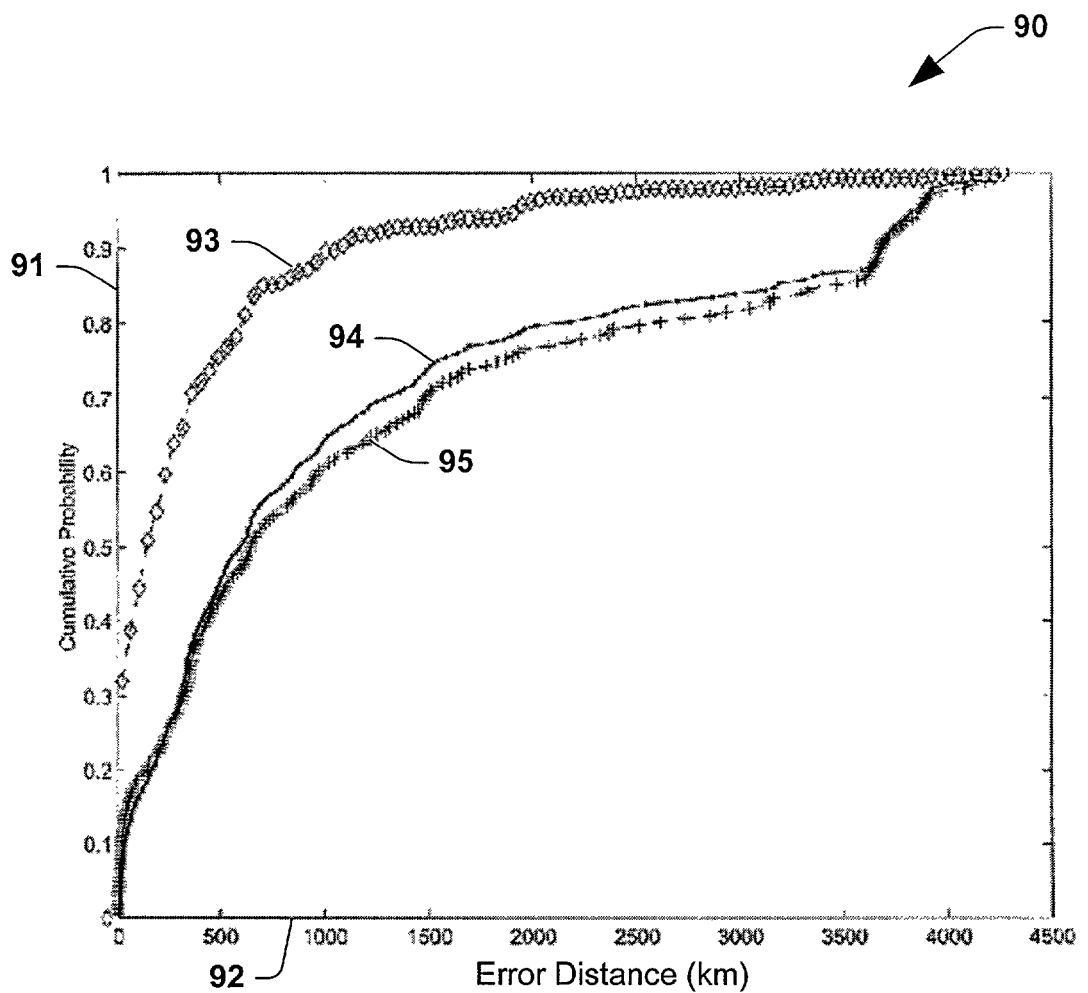
FIG. 5 is an illustration of an exemplary comparison of cumulative distribution functions of error distance results obtained via an exemplary GeoTrack method according to an aspect of the invention.

Referring now to FIGS. 3-5, the exemplary GeoTrack implementation was evaluated by estimating the locations of two test samples of IP addresses. The experiments were performed from 14 different source points, collectively referred to as 70, in the United States, as illustrated in FIG. 3. The U.S. comprises 50 states, 48 of which are located in the large geographic area depicted in FIG. 3, and two others that are located 2000 km to the northwest and 4000 km to the southwest, respectively, of this landmass. In addition, the data sets recorded the U.S. capital, Washington D.C., as a separate entity, so the results effectively included 51 "states". The U.S. is also home to a sizeable fraction of the Internet, in terms of networks, routers, end hosts, and users.

In the first experiment, the GeoTrack tool was run from the 14 probe locations illustrated in FIG. 3, using a database hereinafter referred to as UnivHosts as the target dataset. The UnivHosts database comprises a list of 256 web servers located across university campuses in 44 states of the U.S. For each data point, an error distance was defined to be the geographic distance between the actual location of the data point and the location as determined by the GeoTrack tool. The distance between two geographic locations was computed as the shortest path between the two locations. A cumulative probability distribution function (e.g., CDF) was then computed of the error distance for each of the 14 sources. The results are shown in FIG. 4, which illustrates a plot 80 of cumulative probability 82 vs. distance 84 (km) for four different probe locations. The plot 80 of FIG. 4 illustrates the cumulative distributions 85, 86, 87, and 88 of the probe locations located at Johns Hopkins University, Stanford, Rutgers, and Dallas, respectively.

In a second experiment involving the exemplary GeoTrack implementation, error characteristics were computed for a Client IP address dataset that was constructed from an online TV program guide where users may check on program listings for a specific zip code. A list was obtained of 142,807 unique client IP addresses and 336,181 pairs of (IP; zip) data corresponding to the client IP address and the zip code that the user specified in a query. A subset of the IP addresses had more than one corresponding zip code (usually clustered together geographically). The assumption made is that users would tend to enquire about TV programs for zip codes in their vicinity, so an association can be made between the client IP address and the zip code that is queried.

For experimental analysis, a random sample was used of 2,380 IP addresses of clients who accessed the online program guide. GeoTrack was employed to determine the location of the clients from 3 different sources. The 3 different sources in this experiment were located at Stanford, Calif. (West Coast), St. Louis, Mo. (Central U.S.) and the University of North Carolina at Chapel Hill, N.C. (East Coast). In the second experiment, the error distance of an IP address was defined as the distance between the location determined by the exemplary GeoTrack tool and the zip code location entered by the user.

It will be noted at this point that an IP address may be associated with multiple locations, suggesting that the IP address is allocated dynamically (e.g., using dynamic host configuration protocol (DHCP) for dialup clients) or it is assigned to a proxy host (e.g., a web proxy or a firewall). Consequently, multiple clients in different locations may use the same IP address at different times. The performance of the Client IP dataset to the UnivHosts dataset was computed for the four different probe locations described above. In FIG. 5 a plot 90 of cumulative probability 91 vs. distance 92 illustrates the performance of the exemplary GeoTrack implementation as a comparison of the CDF of error distance for the UnivHosts dataset 93 and the TV program guide dataset for UNC 94. The plot 90 also shows the performance of the whois-based NetGeo tool for the TV program guide dataset 95.

In the GeoTrack implementation, traceroutes were performed from multiple locations. There are still a lot of clients that connect to the Web via a shared proxy. In such cases, one can determine only the location of the proxy and not the actual location of the client. However, a variant of the GeoTrack methodology, hereinafter referred to as GeoTrack-M, improves the average error distance of the estimated Internet host location by running GeoTrack from multiple sources and determining the last recognizable router from the multiple sources. GeoTrack-M reports the majority of the locations reported from different sources.

Figure 6:
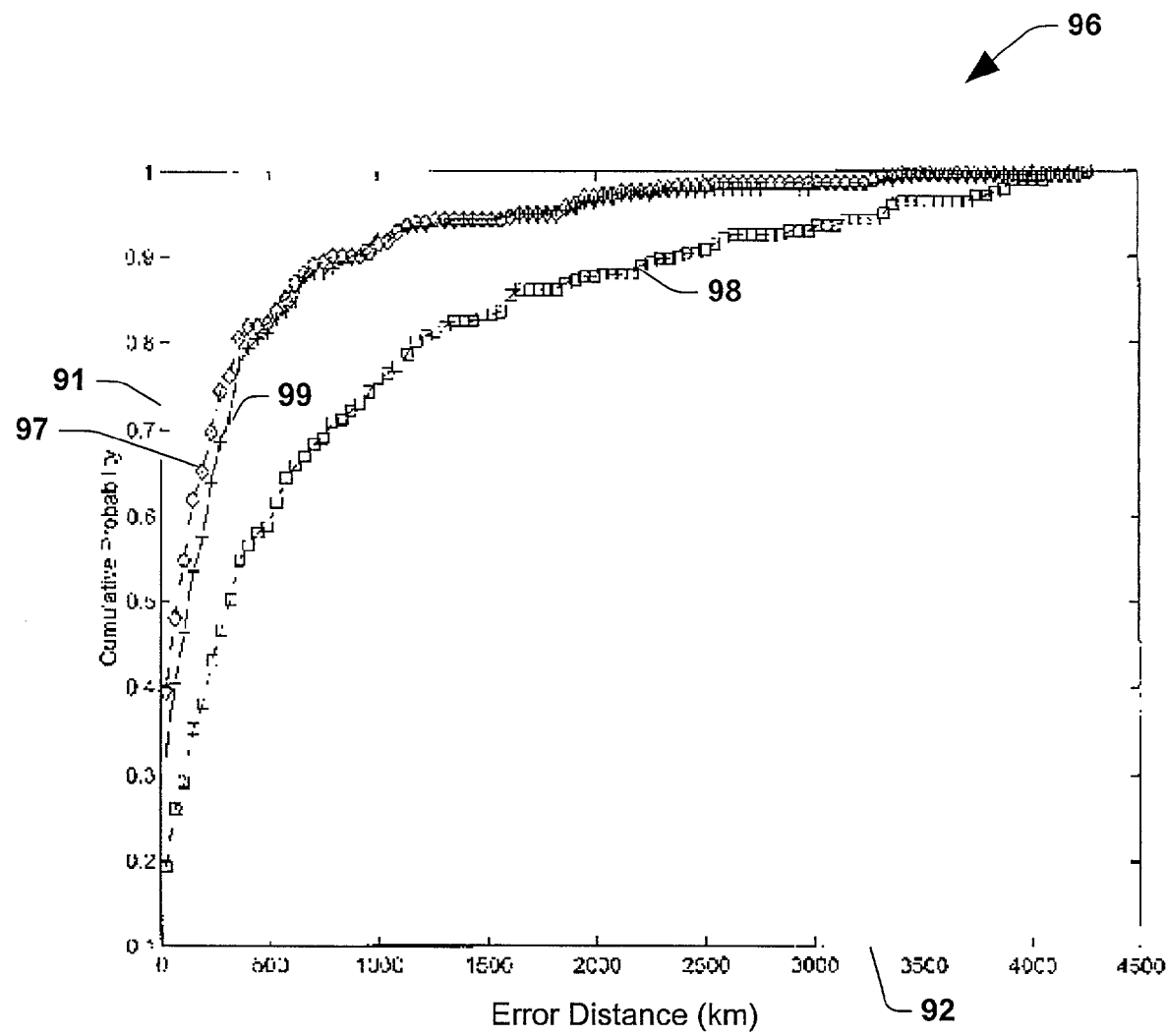
FIG. 6 is an illustration of exemplary cumulative distribution functions of error distance results obtained via another exemplary GeoTrack method employing multiple locations according to another aspect of the invention.

An illustration is provided in FIG. 6 of exemplary cumulative distribution functions of error distance results, which were obtained via another exemplary GeoTrack method employing multiple probe locations, as well as GeoTrack employing single probes located in St. Louis and at Johns Hopkins University, respectively (e.g., using the UnivHosts dataset). In this regard, the traceroutes may be initiated from multiple probes according to another aspect of the invention, whereby the coverage and/or accuracy of the GeoTrack technique may be further improved. In FIG. 6 a plot 96 of cumulative probability 91 vs. distance 92 illustrates the performance of the exemplary GeoTrack implementation as a comparison of the CDF of error distance for the single probe location at St. Louis 97, the single probe location at Johns Hopkins University 98, and for the GeoTrack technique employing multiple probe locations (e.g., GeoTrack-M) 99. As can be seen from the results in FIG. 6, the use of multiple probe locations (99) in the GeoTrack technique provides significant improvement over the single probe located at Johns Hopkins University 98, and comparable results to those obtained with the single probe located in St. Louis 97.

Figure 7:
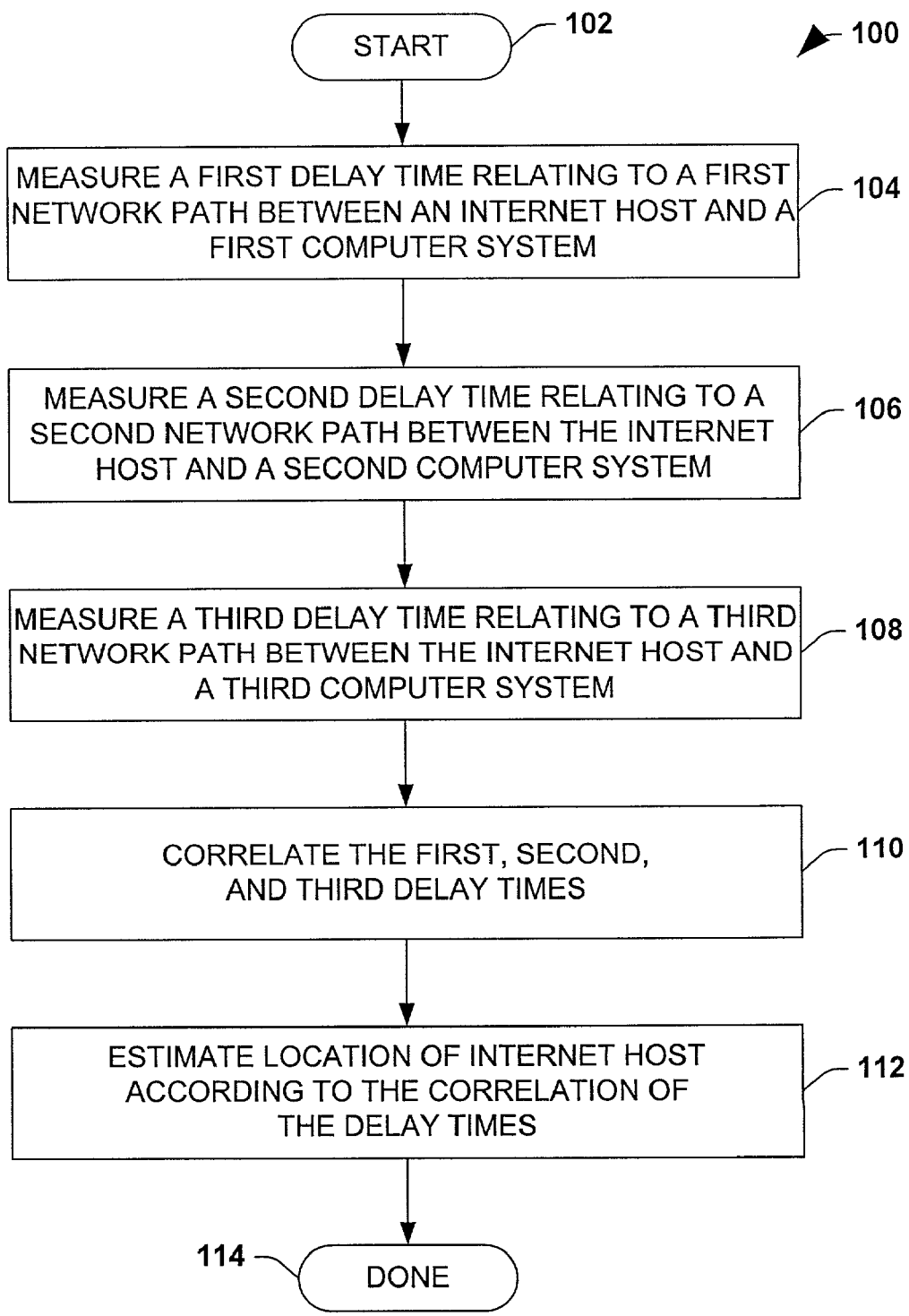
FIG. 7 is a flow diagram illustrating an exemplary GeoPing method of determining the location of an Internet host in accordance with another aspect of the invention.

Referring now to FIG. 7, GeoPing is another methodology and tool according to the invention, which may be employed to determine the geographic location of an IP address by exploiting the relationship between network delay and geographic distance. The GeoPing tool measures the delay to a host from multiple sources at known locations and attempts to correlate the delay measurements to triangulate the coordinates of the Internet host of interest. GeoPing may employ GeoTrack as a tool for determining the location of intermediate routers and thereby help in constructing a model that captures the relationship between network delay and geographic distance.

An exemplary GeoPing method 100 is illustrated in FIG. 7, for determining the location of an Internet host (e.g., host 4 of FIG. 1). Although the exemplary method 100 is illustrated and described herein as a series of blocks representative of various events and/or acts, the present invention is not limited by the illustrated ordering of such blocks, as some blocks may occur in different orders and/or concurrently with other steps apart from that illustrated and described herein, in accordance with the invention. In addition, not all illustrated blocks, events, or acts may be required to implement a methodology in accordance with the present invention. Moreover, it will be appreciated that the exemplary method 100 may be implemented in association with the apparatus and systems illustrated and described herein as well as in association with other systems not illustrated.

The method 100 begins at block 102, after which a first delay time is measured at block 102, relating to a first network path between a host IP address associated with the Internet host and a first computer system (e.g., system 6). At block 106, a second delay time is measured relating to a second network path between the host IP address and a second computer system, and at block 108, a third a third delay time is measured relating to a third network path between the host IP address and a third computer system. At block 110, the first, second and third delay times are correlated, such as by triangulation, before a host location estimate is provided at block 112 according to the delay time correlation. The method 100 ends at block 114. It will be appreciated that while the exemplary method 100 is illustrated and described as employing three measurements, that any number of such measurements may be employed in accordance with the invention.

The correlation at block 110 may comprise consulting a data store comprising N sets of first, second, and third delay measurements between the first, second, and third computer systems, respectively, and N known hosts, as well as location information associated with the N known hosts, wherein N is an integer. The estimation of the host location may thus comprise performing a comparison of the first, second, and third measured delay times with the N sets of first, second, and third delay measurements in the data store, determining a nearest set of first, second, and third delay measurements according to the comparison, and providing a location estimate of the Internet host according to the nearest set of first, second, and third delay measurements.

The correlation may accordingly comprise creating a delay vector using the measured delay times, and comparing the resulting measured delay vector with known delay vectors (e.g., in a delay map in a data store). The location estimate may be provided, for instance, by selecting the location of a known delay vector (e.g., from the delay map) closest to the measured delay vector, and/or by triangulating the locations of a plurality of known delay vectors close to the measured delay vector.

For example, the comparison of the first, second, and third delay times with the N sets of first, second, and third delay measurements in the data store may comprise determining N Euclidian distances corresponding to the Euclidian distances between the N sets of first, second, and third delay measurements in the data store and the first, second, and third delay times. In this case, providing a location estimate of the Internet host according to the nearest set of first, second, and third delay measurements may comprise selecting location information associated with the set of first, second, and third delay measurements in the data store associated with the smallest Euclidian distance as the location estimate.

Alternatively, the correlation may comprise computing a first probability density function establishing a relationship between a first network delay associated with the first computer system and a first distance from the first computer system, and determining a first distance estimate representative of the distance between the first computer system and the location of the Internet host using the first delay time and the first probability density function. The correlation may further comprise computing second and third probability density functions establishing relationships between second and third network delays associated with second and third computer systems, respectively, and second and third distances from the second and third computer systems, respectively. In this case, the method comprises determining second and third distance estimates representative of the distances between the second and third computer systems and the location of the Internet host using the second and third delay times and probability density functions. In this instance, providing the location estimate comprises triangulating the first, second, and third distance estimates.

The GeoPing methodology may thus comprise one of two or more different statistical methods for developing a delay-based host location tool. These are hereinafter referred to as NNDS and PDF-based, wherein NNDS stands for Nearest Neighbors in Delay Space, and wherein PDF-based refers to the employment of PDFs (probability density functions) for each source (i.e., probe location) that establish a relationship between the network delay and the geographic distance from that source.

In order to exploit the relationships between network delay and geographic distance, one aspect of the GeoPing method employs a PDF-based delay triangulation. The PDF-based method may thus compute an error function over an entire location space and find the coordinates where the error function is minimized. Every location is associated with an error measure, which provides an indication of how far it is from the actual location of the host. In one exemplary implementation of the PDF-based GeoPing method, the error function is minimized across a list of known cities, which are geographically distributed, and the city with the minimum value of the error function is reported as the location of the host.

Several error functions may be employed as part of the GeoPing method, which are based on the probability distribution of geographic distance as a function of the network delay from each source. In the following discussion, S denotes the location of a probe source (e.g., computer system 6 of FIG. 1), H refers to the host whose location needs to be determined (e.g., host 4), CT refers to a collection of cities within a geographic region (e.g., the United States), L denotes an element drawn from the city list CT, d(S; L) is the distance between source S and the location L, and rtt(S; H) is the round trip time of the host H from the source S.

According to another aspect of the GeoPing method, a weighted least mean squares (LMSQ) method is employed.

In weighted least mean squares, the error function is computed at a particular location L for a given source, S, as follows:

1. Given rtt(S; H), find the top K (e.g., =3 by default) peaks of the probability distribution of the distance for a small delay range around rtt(S; H).

2. For each peak P among the K peaks, compute the error to be $err(P; S; L)=(d(P)-d(S; L))^2/prob(P)$, where d(P) and prob(P) refer to the distance value corresponding to the peak P and its probability density in the PDF.

3. Among the K error values, compute the minimum value of error to be the error measure of the location with respect to source S. Therefore $error(S; L)=\min_P (err(P; S; L))$.

4. The error measure with respect to all sources for a particular location L is the sum total of all errors from different sources. Mathematically, $error(L)=\Sigma_S\, error(S; L)$.

The LMSQ algorithm reports the location L with the least value of error(L). The reasoning behind choosing the top K peaks is to take into consideration the presence of multiple disjoint peaks in the probability distribution function and the prob(P) term is used to weigh the error inversely to the probability distribution around the peak.

A second aspect involves employment of a probability density estimation, referred to hereinafter as PROB. In the Probability based method, a joint probability distribution is computed for every location based on the delay information and the joint probability distribution is maximized. The tasks in the computation of the joint probability for a location L are:

1. Assume a distance window of $\delta$ (e.g., =50 miles) around a given distance value.

2. Given the distance d(S; L) for a location L and source S, define the probability p(S; L) to be the area under the probability density curve within a distance window of $\delta$ around d(S; L).

3. Compute the joint probability to be the product of the individual probabilities, $p(L)=\pi_S(p(S; L))$.

In this case, the location L with the maximum value of p(L) is reported as the estimate of the location of the host H.

A third aspect involves composite statistical approaches, combining the two statistical mechanisms LMSQ and PROB described above, which remove the noise in the system. The GeoPing method may thus combine different statistical approaches to improve the accuracy in the location estimation. In one such composite approach, hereinafter referred to as LMPR, the LMSQ method is used to prune the solution space and PROB is used to optimize on the pruned space. In a second composite approach, referred to hereinafter as PRLM, the PROB method is used as the pruning tool and LMSQ as the optimization tool.

The tasks employed in LMPR may include the following:
1. Compute $\min_{LMSQ}=\text{minimum}_L(error_{LMSQ}(L))$.
2. Let X be the set of all locations L such that $error_{LMSQ}$ (L) is less than or equal to THRESHOLD×$\min_{LMSQ}$.
3. Compute the location L in X with the maximum value of p(L) as defined in the PROB method.

As described above, the GeoPing method may comprise use of the nearest neighbor in the delay space (NNDS). The NNDS approach involves clustering points based on their locality in the delay space. A list of known hosts and their locations was considered, and the corresponding delays from multiple known sources were determined. The geographic location of a host was characterized using an N-dimensional delay vector, wherein each coordinate represents the minimum network delay to that host from a particular source. Mathematically, every data point X may be characterized by a delay vector $D(X)=(d_1\, ;:::;\, d_N)$ where $d_i$ is the minimum delay of X from source i. This delay vector may be labeled with location L, the geographic location of X. Given the delay vector of D(U) of an unknown host U, the nearest neighbor Y is determined in the N-dimensional delay space (e.g., using the Euclidian measure of "distance" in delay space, such as the square root of the sum of the differences squared). The location of Y is then reported as the location of U.

Figure 8:
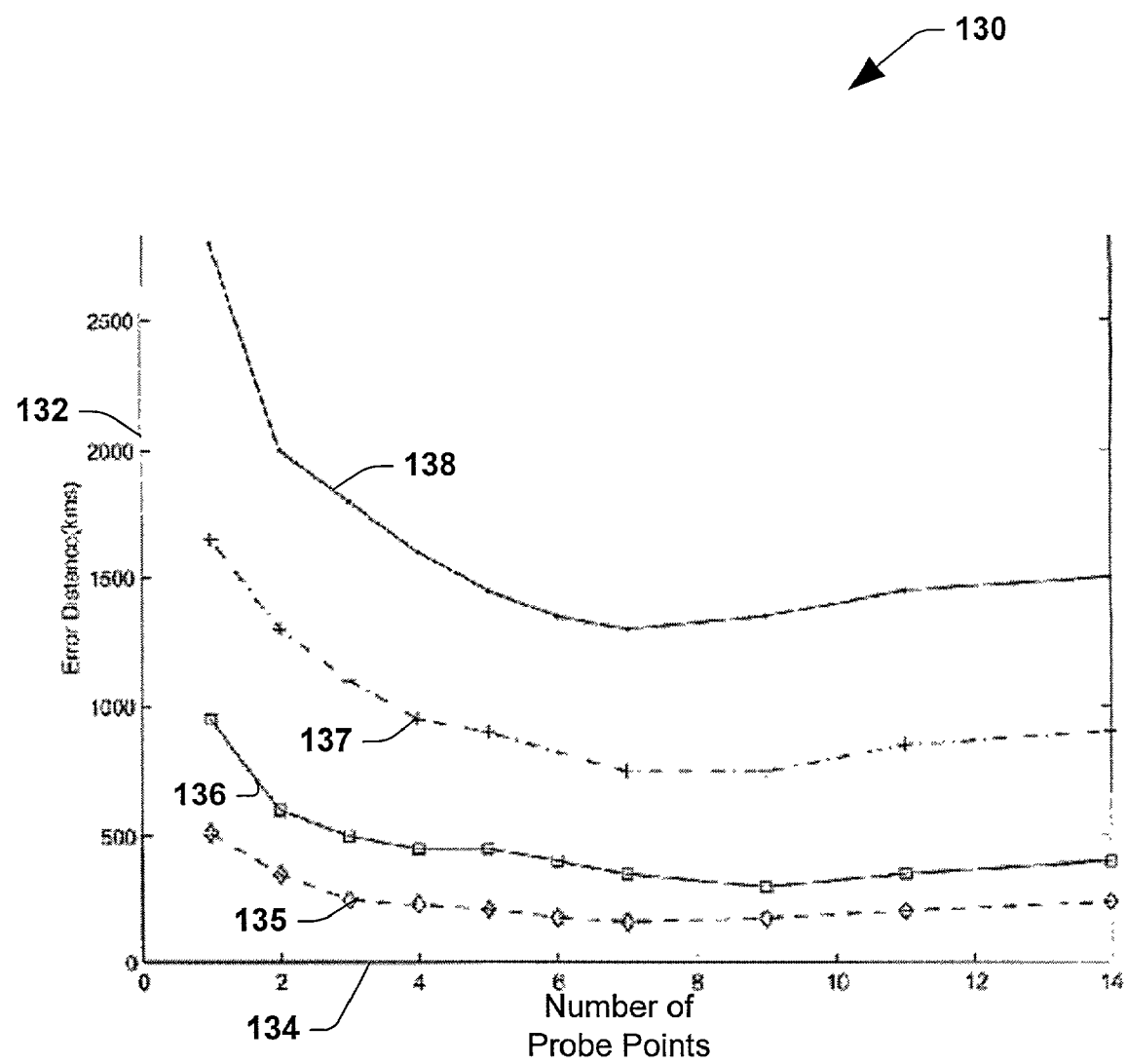
FIG. 8 is an illustration of exemplary mean error distance vs. number of probe points data results obtained according to an aspect of the invention.

Referring now to FIG. 8, a plot 130 of exemplary test results are illustrated as mean error distance 132 vs. number of probe points 134 (e.g., characteristics at different percentiles in CDF plots). Two different experiments were performed to study the error distance characteristics. The UnivHosts dataset was employed as the sample data set and the test data set in our experiments. In other words, for determining the location of one university server, the data set of all other universities (e.g., excluding the one being located) was used as the sample dataset. Plot 130 of FIG. 8 illustrates the 25th, 50th, 75th, and 90th percentile levels 135, 136, 137, and 138, respectively, of the mean error distance as a function of the number of probe points. For example, the 75th percentile curve 137 corresponds to the distance at which the CDF plot of error distance crosses the 0.75 probability mark.

For each percentile level and number of probes (say n), the mean error distance was computed to be the average of error distances corresponding to several geographically distributed placements of n probes locations (in our experiments, these were chosen from a set of 14 possible locations). For example, for 2 probes, the error distance was averaged over different placements of 2 probes in geographically dispersed locations among the 14 possible locations. It will be noted from FIG. 8, that the error distance initially decreases sharply as the number of probes increases, then stabilizes and reaches an optimal value between 7 and 9 probe locations, and finally increases slightly for higher values, for the exemplary GeoPing implementation.

Experiments indicate that NNDS outperforms the probability-based techniques. Given a rich enough training data set, NNDS is more robust than the probability-based techniques because it is better able to deal with outliers in the delay-distance relationship. For example, if an ISP connects to the Internet via a high-latency satellite link, hosts of that ISP may have a large delay even when measured from other hosts that are quite close geographically. So long as there is at least one data point corresponding to this ISP in the training data set, NNDS would be able to infer the correct location.

Figure 9:
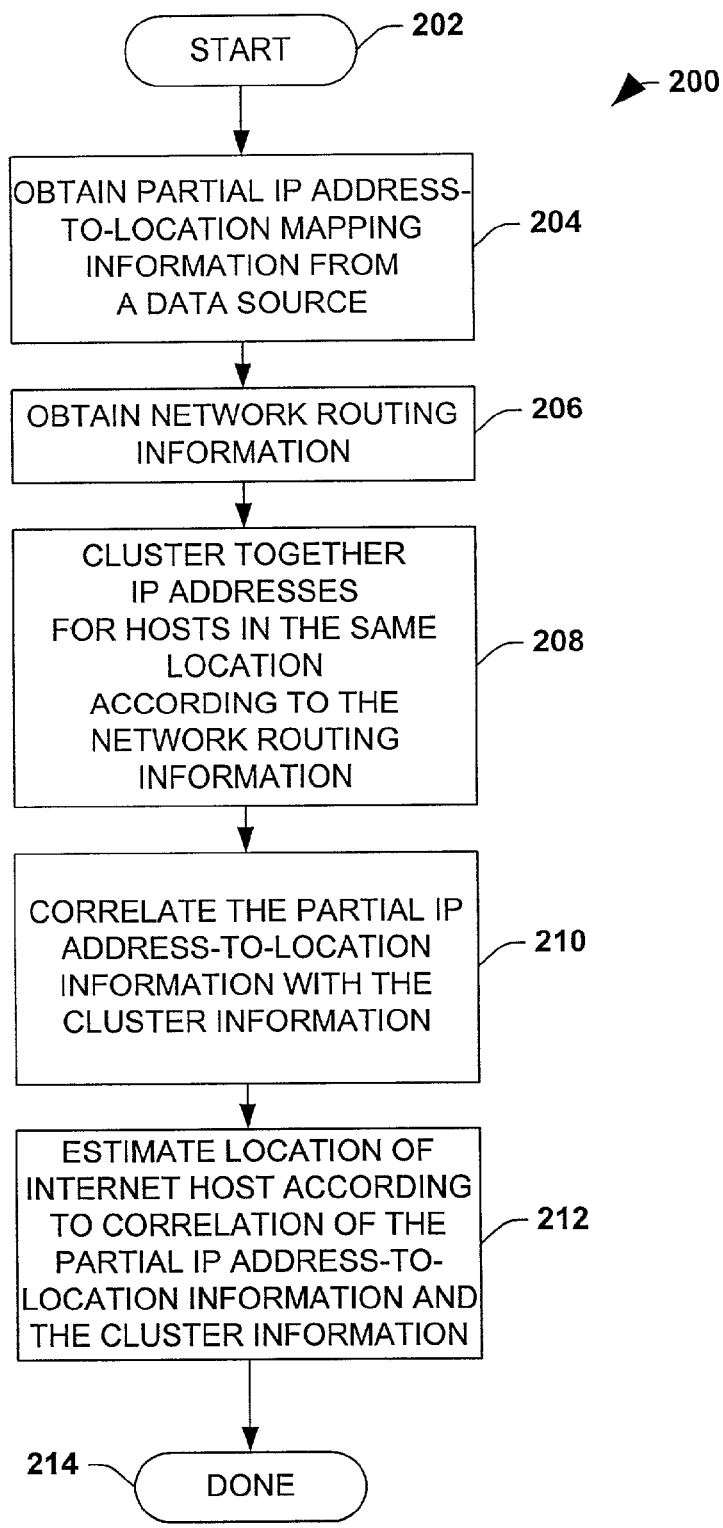
FIG. 9 is a flow diagram illustrating an exemplary GeoCluster method of determining the location of an Internet host in accordance with another aspect of the invention.

Referring now to FIG. 9, an exemplary GeoCluster method 200 is illustrated for determining the geographic location of a host. Although the exemplary method 200 is illustrated and described herein as a series of blocks representative of various events and/or acts, the present invention is not limited by the illustrated ordering of such blocks, as some blocks may occur in different orders and/or concurrently with other steps apart from that illustrated and described herein, in accordance with the invention. In addition, not all illustrated blocks, events, or acts may be required to implement a methodology in accordance with the present invention. Moreover, it will be appreciated that the exemplary method 200 may be implemented in association with the apparatus and systems illustrated and described herein as well as in association with other systems not illustrated.

Beginning at block 202, partial IP address-to-location mapping information is obtained at block 204, after which network routing information is obtained at block 206. For example, the network routing information may be obtained using a routing protocol such as BGP, RIP, OSPF, IGRP, EGP, and the like. At block 208, IP addresses are clustered together for hosts in the same location according to the network routing information obtained at block 206. Thereafter, at block 210, the partial IP address-to-location information is correlated with the cluster information, and a location estimate is provided at block 212 according to the correlation, and the method 200 ends at block 214.

The exemplary method 200 is one implementation of the GeoCluster methodology according to another aspect of the present invention. The clustering together of IP addresses corresponding to hosts in the same geographic location according to network routing information to obtain cluster information may additionally comprise associating an address prefix used by a routing protocol with a geographical location. Moreover, the GeoCluster method may employ a sub-clustering algorithm, which involves sub-dividing the address prefix into at least two clusters according to the geographic spread in the locations associated with the original address prefix. Furthermore, the GeoCluster methodology may include computing a dispersion metric representative of the accuracy of the location estimate for an Internet host.

The GeoCluster technique may obtain IP-to-location mapping information from one or more data sources. Since such information tends to be partial in coverage (e.g., includes location information for only a relatively small subset of the IP address space), GeoCluster clusters together IP addresses corresponding to hosts likely to be in the same geographic location (e.g., addresses that form a geographic cluster). Clustering allows expansion of the coverage of the partial IP-to-location mapping information. As a simple example, it may be known that IP address prefix 128.127.126.0/24 forms a topological cluster. Furthermore, assuming that the partial mapping information indicates that the location corresponding to 10 different IP addresses in this cluster is Foo City, then it may be reasonably deduced that the address prefix also corresponds to a geographic cluster and that the remaining 246 IP addresses in this cluster (if they are indeed in use) are also likely to correspond to hosts in (or near) Foo City.

The original IP-to-location mapping information may not be entirely accurate. The aggregation that results from clustering helps alleviate the impact of inaccurate data. For example, if a significant majority of the data points corresponding to an address prefix agree on location, then the minority that do not agree on location are probably erroneous and can be discarded. Thus clustering thus allows refinement of the partial IP-to-location mapping information.

The GeoCluster technique approaches the clustering problem in a novel way by combining partial IP-to-location mapping information with network routing information. Address allocation and routing in the Internet is hierarchical. Routing information is aggregated across hosts that are under a single administrative domain (also known as an autonomous system (AS)). For example, the routes for hosts on a university campus would typically be advertised to the rest of the network as a single aggregate, for example, the address prefix 128.127.0.0/16, rather than 65,536 individual IP addresses. Thus, knowledge of the address prefixes (APs) used by the routing protocol allows the identification of topological clusters.

For example, information on APs may be derived from the border gateway protocol (BGP) used for inter-domain (e.g., inter-AS) routing in the Internet. Each entry in the BGP table at a router specifies a destination AP, and the AS-level path leading to it. A list of unique APs may be constructed from the BGP routing table. The resulting number of APs tends to be an order of magnitude larger than the number of ASs. This is because an AS, such as an ISP, may advertise more specific routes (e.g., for certain customers), due to policy and/or performance considerations (e.g., for load balancing).

An AS (and its associated AP(s)) often corresponds to a geographical cluster such as a university campus or a company office. Even when the AS is an ISP with large geographic coverage, the associated APs that are advertised via BGP may be more specific (e.g., corresponding to individual customers), as explained above. In both these cases, GeoCluster is adapted to identify geographic clusters from AP information. Thus, the GeoCluster method may discover APs from E-BGP data and treat these APs as geographic clusters. We term this variant of GeoCluster as BGPonly. The GeoCluster method may further employ the sub-clustering algorithm described earlier. We term this variant of GeoCluster as BGP+subclustering.

The BGP+subclustering variant of the GeoCluster methodology employs the (partial) IP-to-location mapping information available to subdivide APs that have a large geographic spread. Thus, for each original AP obtained from E-BGP, the method may employ the IP-to-location mapping information to determine whether there is "significant" consensus on the geographic location of the AP. If there is, then the AP may be determined to be a geographic cluster. If not, the AP may be sub-divided, for example, into two halves (e.g., the AP 152.153.0.0/16 may be subdivided into 152.153.0.0/17 and 152.153.128.0/17). The same test may then be applied for each sub-divided half. The sub-clustering algorithm may be stopped either when there is "significant" consensus in the geographic locations corresponding to a subdivision or when the subdivision contains too few IP-to-location mapping data points for a reliable determination of geographic clustering to be made. In the end, a mapping is obtained from APs (both original and subdivided ones) to (likely) location. Thereafter, given an IP address, the matching AP may first be found using longest prefix match and thereafter the corresponding location may be reported as the location of the IP address.

Below is the pseudocode for an exemplary sub-clustering algorithm. Let IPLoclist be the list of IP-to-location mapping data points sorted by IP address, BGPAPlist be the list of APs obtained from E-BGP information, IPLocAPlist be the sorted list obtained by augmenting the entries in IPLoclist with the APs corresponding to the longest prefix match, newAPLoclist be the new list mapping APs to location obtained by (possibly) subdividing the original APs, and cthresh be the minimum threshold on the number of IP-to-location mapping data points within a subdivision.

```
/* initialization */
IPLoclist = sorted IP-to-location mapping
BGPAPList = APs derived from E-BGP info
/* determine matching APs */
foreach ((IP,location) in IPLoclist) {
  AP = LongestPrefixMatch(IP,BGPAPlist)
  Add (IP,location,AP) to IPLocAPlist
}
/* subdivide APs using IPLocAPlist */
sameAPlist = EMPTY
curAP = AP in first entry of IPLocAPlist
foreach ((IP,location,AP) in IPLocAPlist) {
  if (AP in (IP,location,AP) = curAP) {
    /* contiguous list with same AP */
```

```
    Add (IP,location,AP) to sameAPlist
  } else {
    /* Subdivide curAP as appropriate */
    if(|sameAPlist| ≥ cthresh) {
      if(sameAP list is geographically clustered) {
        avgLocation = average location of cluster
        Add(curAP,avgLocation) to newAPLoclist
      } else {
        Divide curAP into two equal halves
        Divide sameAPlist accordingly
            Recursively test whether either/both of subdivisions form a
            geographic cluster
        }
      }
    }
    /* reset/reinitialize sameAPlist */
    sameAPlist = NULL
    Add (IP,location,AP) to sameAPlist
  }
}
new APLoclist is the new list used for IP-to-location mapping
```

Considering aggregates of IP-to-location data points also offers the advantage that isolated errors in the individual data points can be neutralized. For instance, suppose that 90% of the IP-to-location data points corresponding to an AP agree on the location being California while the remaining 10% are scattered elsewhere. It may be reasonably assumed that the entire AP is located in California and any discrepancies may be attributed to errors in the IP-to-location mapping data.

Regarding the determination of whether a set of locations is clustered geographically or the manner in which the average" location of a cluster is computed, these issues may be context-dependent, for example, dependent on the granularity of the location information contained in the partial IP-to-location mapping and/or on the needs of a particular application. For example, in case the location information is relatively fine-grained (e.g., zip codes), the location of the individual points may be quantifiable (e.g., using latitude and longitude). Thus, a composite location may be computed using averaging. In addition, a dispersion metric may be computed, which quantities the spread. Moreover, where the location information is coarse-grained (e.g., states), tests may be performed to determine whether more than a certain fraction of the points agree on location.

Many Internet clients lie behind proxies and/or firewalls that separate the corporate or ISP network from the rest of the Internet. In this situation, the proxy or firewall often connects to external Internet hosts (e.g., web servers) on behalf of the client hosts. Consequently, the IP address of the client hosts may remain hidden from the external network. As such, it may be difficult or impossible to directly map from the IP address to the actual location for such clients.

The sub-clustering algorithm of the GeoCluster method addresses this issue. For example, where the set of clients that connect via a group of proxies (e.g., having IP addresses that are included within an address prefix AP) is clustered geographically (e.g., at a location L), then given a sufficient number of IP-to-location data points, the sub-clustering algorithm determines an association between the address prefix AP and the location L. Thus, the sub-clustering may be advantageously employed in the case of clients on a university or corporate campus, or in association with clients of an ISP which connect via a local (e.g., or regional) proxy.

However, there may be instances (e.g., the ISP America Online (AOL)) where clients in geographically diverse locations share a common pool of proxies. For instance, the AOL ISP may include clients thousands of kilometers apart that connect via a common proxy or set of proxies. So all of these geographically dispersed clients would appear to be connecting from the same IP address or IP addresses in the same subnet. In such a case, the GeoCluster sub-clustering algorithm may not be able to determine any geographic clusters. However, in accordance with another aspect of the invention, the GeoCluster tool may be adapted to forego attempts at mapping such an IP address to a client location. An aspect of the GeoCluster method is the self-calibrating feature. The spread in locations corresponding to an address prefix is quantified using the dispersion metric, which may be defined to be the mean distance of these locations and the "average" (i.e., geographic center) of all of these locations. The dispersion allows the GeoCluster methodology and tools incorporating the method to tell when a location estimate is likely to be accurate and when it is not. For example, if the dispersion is larger than a threshold, then GeoCluster may refrain from making a location estimate.

This selective mapping feature allows a location-aware application program or service to refrain from providing location specific content or services in cases where the mapping is not possible or where the confidence in such a mapping is low. The invention thus reduces the likelihood that content specific to a first location will be incorrectly provided to users in a second, possibly remote, location. This is an important feature of the GeoCluster sub-clustering algorithm because for some applications, providing inaccurate location information may be much worse than not providing any information at all. For instance, displaying a generic advertisement on a New York user's screen would probably be better than mistakenly displaying an advertisement specific to California.

The GeoCluster methodology has been employed in an exemplary implementation that was tested in several ways using a variety of datasets. The following is a summary of the results. The performance of GeoCluster was compared with that of GeoTrack and GeoPing. Two variants of GeoCluster were tested, the first being GeoCluster employing AP information derived from BGP tables (BG-Ponly), and the second being GeoCluster employing post-processing of the BGP tables using the sub-clustering algorithm (BGP+ subclustering). The results for both GeoCluster variants were compared against a simplistic approach that ignores BGP information and assumes that all APs to have a 24-bit prefix length (/24-clusters).

Initially, the GeoCluster methodology (e.g., the BG-P only variant) was employed in determining the location of the 265 hosts in the UnivHosts list, as described above. The IP-to-location mapping information employed was included in a TV program guide data set. Each zip code in the data set was converted to a corresponding (e.g., approximate) latitude and longitude. Thereafter, using AP information derived from BGP data, the (IP, latitude, longitude) data points were clustered according to the AP that the IP address lies in. For each cluster, a composite location (e.g., a (latitude, longitude) pair) was computed by linearly averaging the latitudes and longitudes of the constituent points. In this fashion, a mapping was obtained between APs and the corresponding (latitude, longitude) pairs. Given an IP address, the matching AP (using longest prefix. 12 match) may be identified, and the corresponding (latitude, longitude) pair may then be reported as the location.

Figure 10:
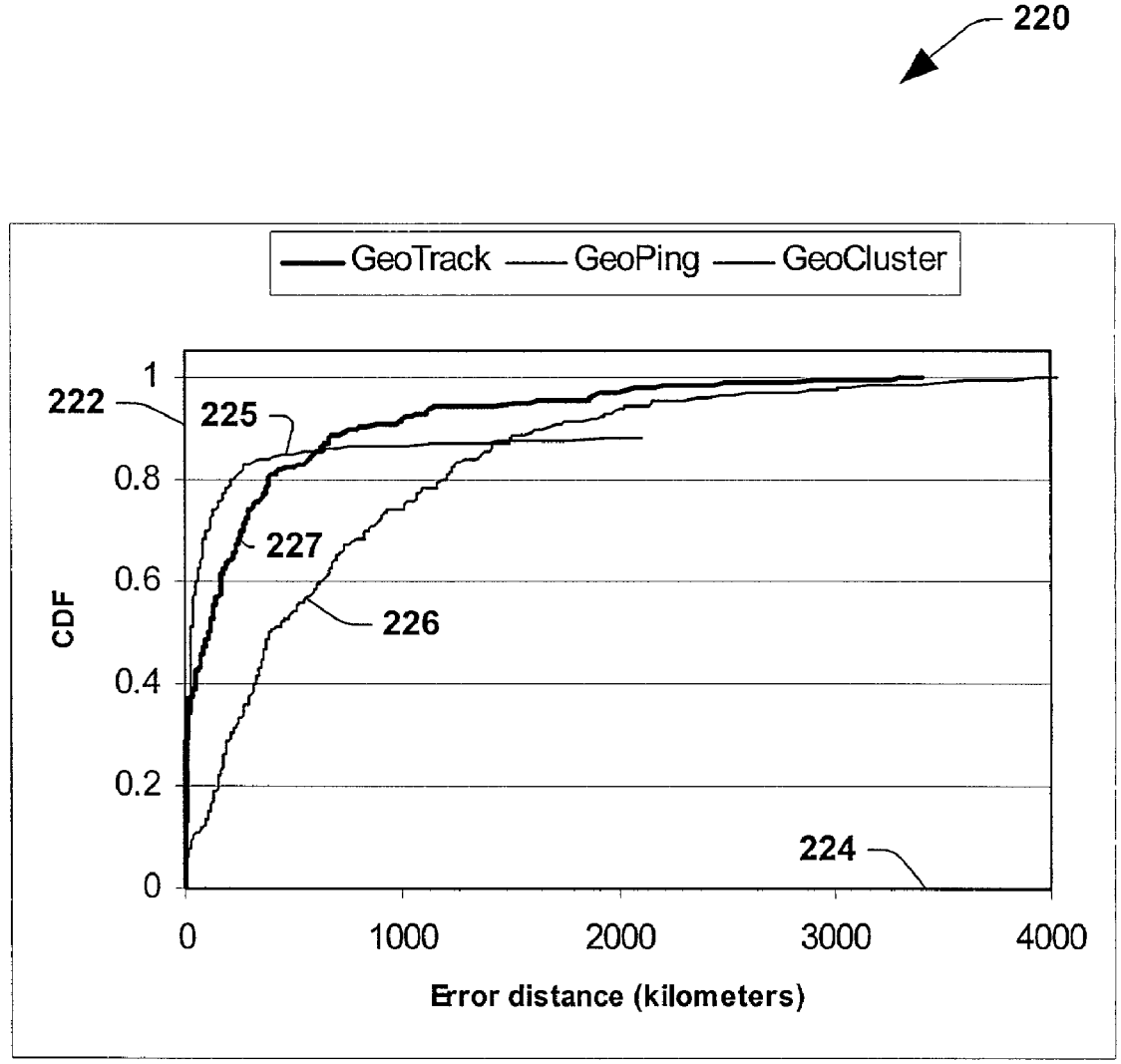
FIG. 10 is an illustration of exemplary CDF error distance results obtained according to an aspect of the invention.

Referring now to FIG. 10, plot 220 illustrates an exemplary set of accuracy results of the location estimated by GeoCluster (e.g., as well as the other techniques) as CDF 222 vs. error distance 224. The plot 220 of FIG. 10 illustrates the CDF 222 vs. error distance 224 for the GeoCluster methodology 225 computed over the 265 university hosts. Also illustrated are the best case CDFs of GeoTrack 227 (e.g., initiated from the St. Louis probe machine) and GeoPing 226 (e.g., using 9 probe machines) for comparison. It will be noted in FIG. 10 that the GeoCluster method 225 is able to deduce the location of 233 out of the 265 university hosts because the IP-to-location mapping data derived from the TV program guide data set is partial in coverage. Despite the clustering performed using BGP data, no location information was available for approximately 12% of the hosts. However, for the vast majority of hosts for which it is able to determine location, the GeoCluster method 225 performs well. For instance, the median and 80th percentile marks for GeoCluster 225 are only 28 km and 226 km, respectively.

Figure 11:
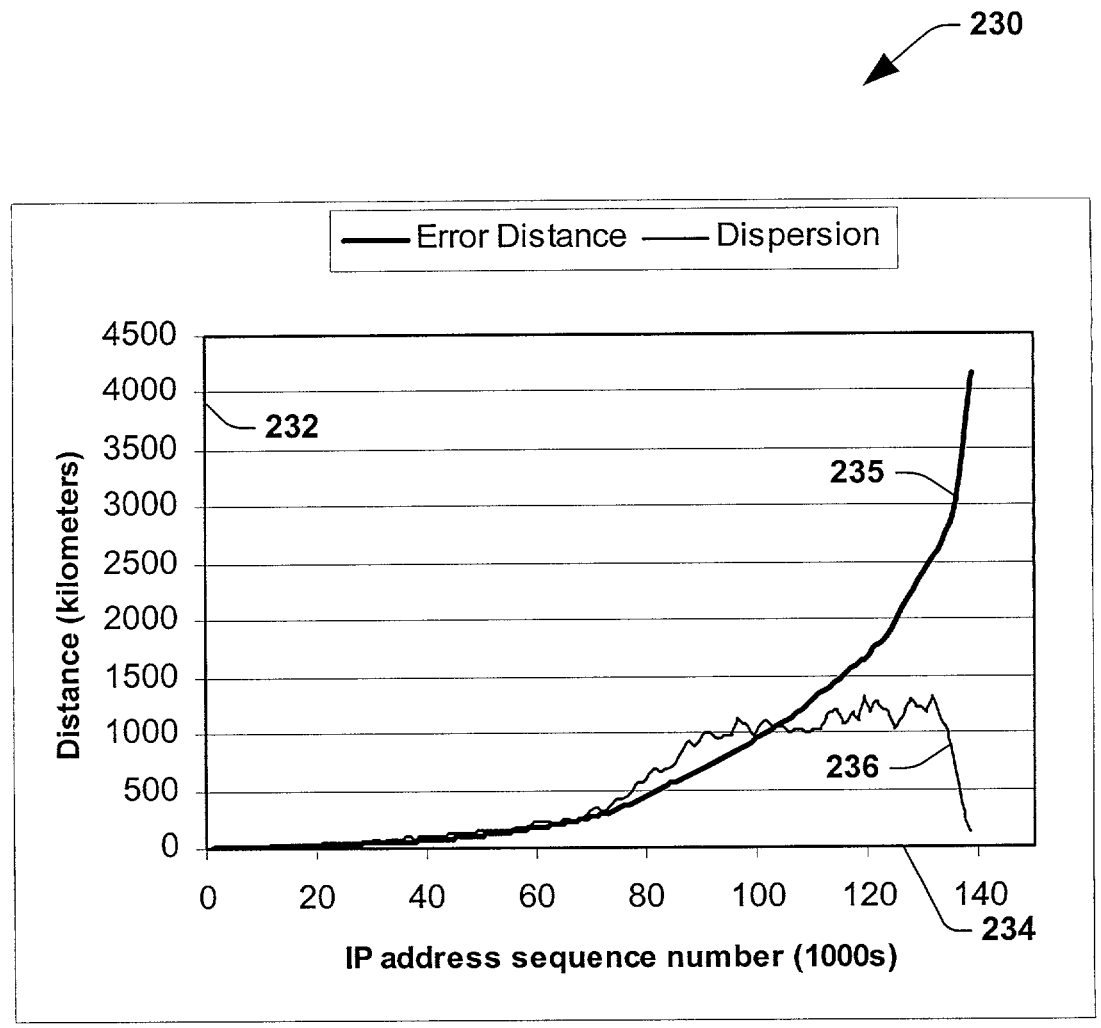
FIG. 11 is an illustration of exemplary error distance and dispersion results obtained according to an aspect of the invention.

FIG. 11 illustrates a plot 230 of distance 232 vs. IP address sequence number 234 for error distance 235 and dispersion 236. The performance of the GeoCluster method was also verified using a much larger test data set, obtained from a business web hosting site. Location information (e.g., at the granularity of zip codes) was recorded at the time of user registration. This information was included in a cookie when a client sent a request to the server. Location information was obtained corresponding to approximately 181,246 unique IP addresses seen during a single day in October 2000. For each IP address in the business web hosting site data set, the location was estimated and then the error distance was computed. The error distance 235, with the IP addresses sorted in increasing order of error distance, is illustrated in the plot 230 of FIG. 11.

Another such data source that was used in the experimental analysis was obtained from a web-based email service with several million active users. Of the over 1 million users for which information was obtained, information was used relating to the 417,721 users who had registered their location as being in the U.S. The location information obtained from the user registration records was at the granularity of U.S. states. In addition, a log was obtained of the client IP addresses corresponding to the 10 most recent user logins (primarily in the first half of 2000). The login and registration information was combined to obtain a partial IP-to-location mapping.

In the case of the business web hosting and TV program guide data sets, the zip code information was mapped to the corresponding (e.g., approximate) latitude and longitude using information from the U.S. Census Bureau. Location information in the web-based email data set is at the granularity of states. The zipcenter of each state was computed by averaging the coordinates of the zip codes included within that state.

It will be noted that the partial IP-to-location mapping obtained from these sources is not expected to be entirely accurate. For instance, in the case of the web-based email data set and the business web hosting data set, users may connect from locations other then the one from which they registered. In the case of the on-line TV program guide, users may enquire about TV programs in areas far removed from their current location, although this is unlikely.

In order to effectively deal with the wide range of error distance for different hosts, another aspect of the invention provides for an indication of when the GeoCluster location estimate is accurate and when it is not. For this purpose, a confidence or accuracy metric may be computed, which may be called dispersion, for each AP as follows. For each AP, all IP addresses are considered from the training set (e.g., the TV program guide data set in the present example) which are included within that AP. A composite location is computed for the AP as a whole using linear averaging. The dispersion metric is then computed for this AP, as the mean distance of the training points from the composite location of the AP. In this regard, it will be appreciated that dispersion quantifies the extent of geographic spread in the AP.

Larger dispersion values would be expected to indicate that the location estimate is less accurate. This relationship is illustrated in FIG. 11, which depicts a dispersion curve 236 for the business web hosting data set using the Geo-Cluster method. It will be noted that the dispersion curve 236 of FIG. 11 matches the error distance curve 235 quite well (e.g., except for hosts at the extreme right). This verifies the relationship since the error in location estimation results from the geographic spread of APs, and it is exactly this spread that dispersion quantifies.

At the extreme right of the graph in FIG. 11, it is noted that error distance 235 shoots up while the dispersion 236 drops sharply. The inventors have found that the apparent discrepancy is caused by errors in the business web hosting data set. As discussed earlier, the location information in the business web hosting data set is gathered from user registration information included in cookies. An IP address recorded in this log may not always correspond to a host in the same location as registered by the user. For example, the business web hosting data set contains the IP address 140.247.147.42 (which maps to the DNS name room 147.42.student.harvard.edu), which presumably corresponds to a host at Harvard University in the northeastern corner of the U.S. However, the corresponding location in the business web hosting data set is Portland, Oreg., 4000 km away in the northwestern corner of the U.S. Thus, the sharp spike in error distance curve 235 is believed to be misleading, as the error distance may in fact be very small.

Figure 12:
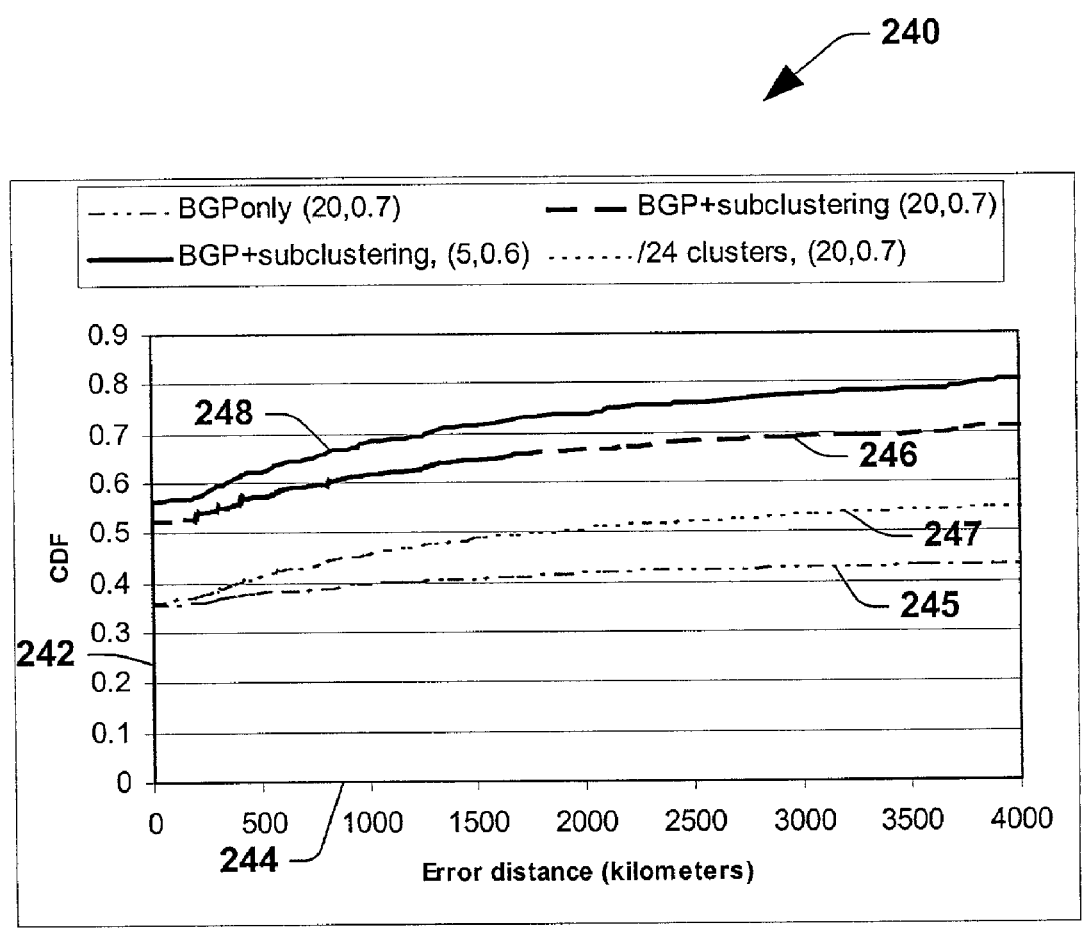
FIG. 12 is an illustration of another set of exemplary CDF error distance results obtained according to an aspect of the invention.

The performance advantages provided by the sub-clustering aspects of the invention have also been tested. In the BGPonly variant of the GeoCluster methodology, the tool employs AP information derived directly from BGP data. Referring now to FIG. 12, the BGP+subclustering variant of the GeoCluster method employs the sub-clustering algorithm to construct an AP-to-location mapping. This algorithm makes use of both BGP data and partial IP-to-location mapping information.

The partial IP-to-location mapping information from the web-based email service data was employed as input to the sub-clustering algorithm. It will be again noted that the location information in the web-based email service data set is at the granularity of states. In order to decide when a set of locations corresponding to an AP is deemed "geographically clustered", the following test was employed. An AP was deemed to correspond to a geographic cluster if it included at least cthresh (IP, location) data points, at least fthresh of which (as a fraction) share the same location (e.g., the same state). A plot 240 is illustrated in FIG. 12 of CDF 242 vs. error distance 244 for a set of exemplary results. In most of the results illustrated in FIG. 12, cthresh was set to 20 and fthresh was set to 0.7 (e.g., denoted as (20; 0.7). Other illustrated results were obtained using a (5; 0.6) setting, as indicated. For example, the plot 240 illustrates results 245, 246, 247, and 248 for BGP only (20, 0.7), BGP+subclustering (20, 0.7), /24 clusters (20, 0.7), and BGP+subclustering (5, 0.6), respectively.

The business web hosting data set information was used as the test data. The location information in the business web hosting data set is at the granularity of zip codes, whereas that in the web-based email service data set is at the granularity of states. In the present test, the accuracy calculations were performed at the granularity of the states. The zip codes in the business web hosting data set were mapped to the corresponding states. The zipcenter of each state was computed by averaging the coordinates of the zip codes included within that state. The error distance was then computed as the distance between the zipcenters of the actual and estimated states. Thus, the error distance was zero if the state is deduced correctly and non-zero otherwise.

FIG. 12 illustrates the plot 130 of the error distance (e.g., computed at the granularity of states) for the BGPonly 245 and BGP+subclustering 246, 248 variants of the GeoCluster method, and for the /24-clusters 247 method. It is noted that BGP+subclustering 246, 248 provides significant advantages. In particular, with the (20; 0:7) setting BGP+subclustering 246 gets the state correct (e.g., an error distance of zero) for 53% of the hosts while BGPonly 245 does so for only 36% of the hosts. The reason is that BGPonly 245 is often stuck with large, geographically-dispersed APs obtained directly from BGP data while the sub-clustering algorithm is often able to break these down into smaller and more (geographically) compact APs. In addition the BGP+subclustering variant of the GeoCluster method performs slightly better with the (5; 0.6) setting (248) compared to the (20; 0.7) setting (246).

Thus, the GeoCluster technique may employ a novel algorithm that combines partial IP-to-location mapping information with BGP routing information to make an intelligent determination of a client's location. The algorithm is able to tolerate an amount of inaccuracy in the IP-to-location mapping information and remain effective in certain situations where clients connect via proxies or firewalls. Furthermore, the GeoCluster technique gives an indication of how accurate its location estimate is likely to be. Thus, the invention is able to handle the difficulties posed by proxies and firewalls in certain situations (e.g., clients on a geographically compact corporate campus or clients that connect via local or regional proxies).

The invention therefore facilitates further improvements in location-aware services for Internet hosts. Targeted advertising is one example, which can be quite effective even if used for only 30-40% of clients. Such advertising can be done at the level of a city (e.g., sporting events), state (e.g., election advertisements), or region (e.g., weather alerts) by employing the various methods and tools of the invention. It will be appreciated that although the exemplary test results illustrated and described herein were performed with respect to data sets including the United States, that the various aspects of the invention find utility in association with other geographic regions, and the world generally. For instance, the invention may be employed to identify or estimate the location of hosts in countries outside the United States. The inventors have extended implementations of the invention to Canada and 26 countries in Europe. It will be further appreciated that the various methodologies and tools of the invention may be combined, and that all such combinations are contemplated as falling within the scope of the present invention. For example, a combination of the GeoTrack and GeoPing methods may employ the network delay from the last recognizable router to the destination host to estimate the location of the latter.

Figure 13:
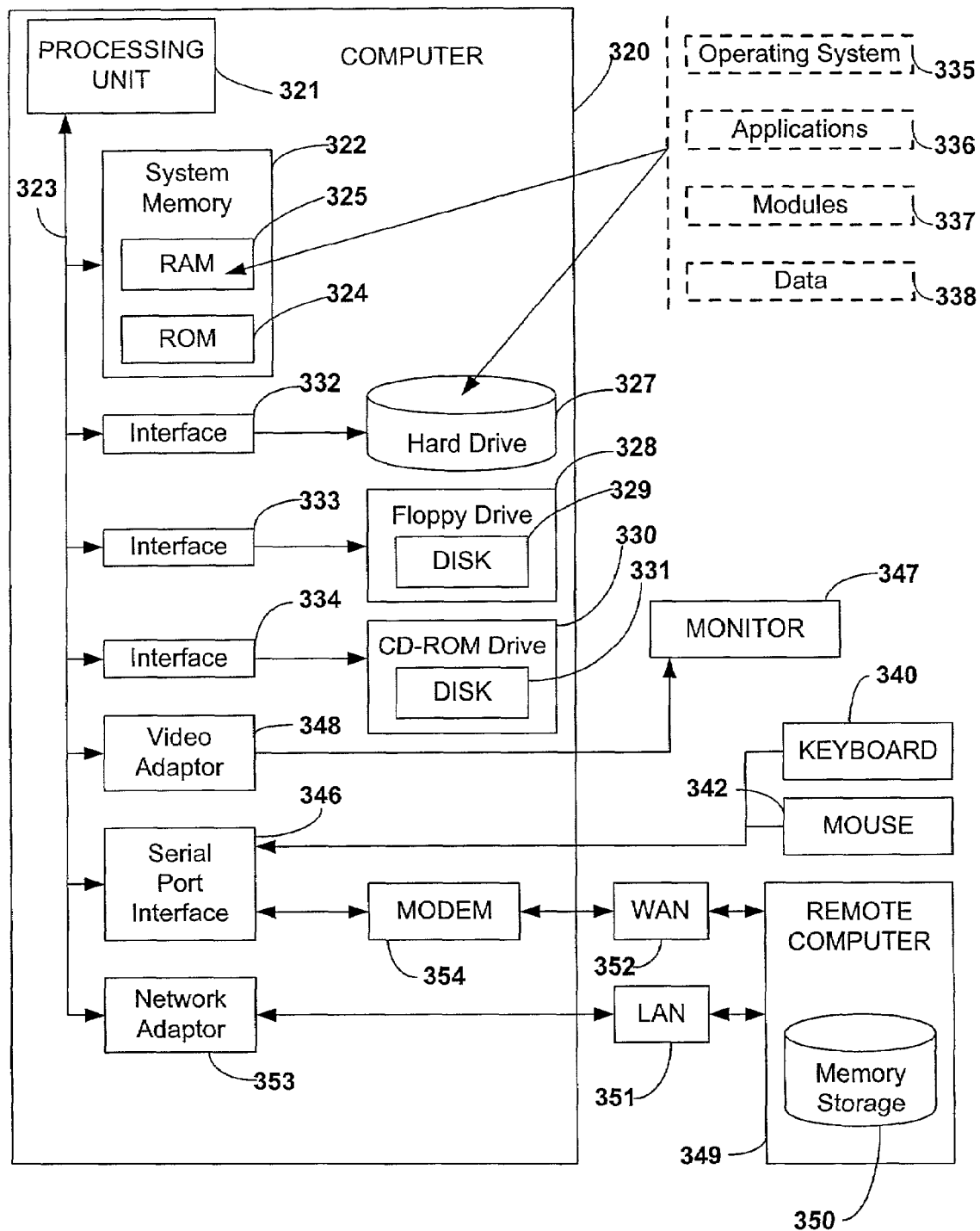
FIG. 13 is a schematic block diagram illustrating an exemplary operating environment in which one or more aspects of the invention may be implemented.

In order to provide a context for the various aspects of the invention, FIG. 13 and the following discussion are intended to provide a brief, general description of a suitable computing environment in which the various aspects of the present invention may be implemented. While the invention has been described above in the general context of software tools and computer-executable instructions of a computer program that runs on a computer and/or computers, those skilled in the art will recognize that the invention also may be implemented in combination with other program modules. Generally, program modules include routines, programs, components, data structures, etc. that perform particular tasks and/or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based or programmable consumer electronics, and the like. The illustrated aspects of the invention may also be practiced in distributed computing environments where tasks are performed by remote processing devices that are linked through a communications network. However, some, if not all aspects of the invention can be practiced on stand-alone computers. In a distributed computing environment, program modules may be located in both local and remote memory storage devices.

With reference to FIG. 13, an exemplary environment for implementing various aspects of the invention includes a conventional personal or server computer 320, including a processing unit 321, a system memory 322, and a system bus 323 that couples various system components including the system memory to the processing unit 321. The processing unit 321 may be any of various commercially available processors. Dual microprocessors and other multi-processor architectures also can be used as the processing unit 321.

The system bus 323 may be any of several types of bus structure including a memory bus or memory controller, a peripheral bus, and a local bus using any of a variety of conventional bus architectures. The computer memory may include read only memory (ROM) 324 and random access memory (RAM) 325. A basic input/output system (BIOS), containing the basic routines that help to transfer information between elements within the computer 320, such as during start-up, is stored in ROM 324.

The computer 320 further includes a hard disk drive 327, a magnetic disk drive 328, e.g., to read from or write to a removable disk 329, and an optical disk drive 330, e.g., for reading a CD-ROM disk 331 or to read from or write to other optical media. The hard disk drive 327, magnetic disk drive 328, and optical disk drive 330 are connected to the system bus 323 by a hard disk drive interface 332, a magnetic disk drive interface 333, and an optical drive interface 334, respectively. The drives and their associated computer-readable media provide nonvolatile storage of data, data structures, computer-executable instructions, etc. for the computer 320, including for the storage of broadcast programming in a suitable digital format.

Although the description of computer-readable media above refers to a hard disk, a removable magnetic disk and a CD-ROM, it will be appreciated by those skilled in the art that other types of media which are readable by a computer, such as zip drives, magnetic cassettes, flash memory cards, digital video disks, Bernoulli cartridges, and the like, may also be used in the exemplary operating environment, and further that any such media may contain computer-executable instructions for performing the methods of the present invention. A number of program modules may be stored in the drives and RAM 325, including an operating system 335, one or more application programs 336, other program modules 337, and program data 338.

A user may enter commands and information into the computer 320 through a keyboard 340 and a pointing device, such as a mouse 342. Other input devices (not shown) may include a microphone, an IR remote control, a joystick, a game pad, a satellite dish, a scanner, or the like. These and other input devices are often connected to the processing unit 321 through a serial port interface 346 that is coupled to the system bus 323, but may be connected by other interfaces, such as a parallel port, a game port, a universal serial bus ("USB"), an IR interface, etc. A monitor 347 or other type of display device is also connected to the system bus 323 via an interface, such as a video adapter 348. In addition to the monitor, a computer typically includes other peripheral output devices (not shown), such as speakers, printers etc.

The computer 320 may operate in a networked environment using logical connections to one or more remote computers, such as a remote computer(s) 349. The remote computer(s) 349 may be a workstation, a server computer, a router, a personal computer, microprocessor based entertainment appliance (e.g., a WebTV client system), a peer device or other common network node, and typically includes many or all of the elements described relative to the computer 320, although, for purposes of brevity, only a memory storage device 350 is illustrated. The logical connections depicted include a local area network (LAN) 351 and a wide area network (WAN) 352. Such networking environments are commonplace in offices, enterprise-wide computer networks, intranets and the Internet.

When used in a LAN networking environment, the computer 320 is connected to the local network 351 through a network interface or adapter 353. When used in a WAN networking environment, the computer 320 typically includes a modem 354, or is connected to a communications server on the LAN, or has other means for establishing communications over the WAN 352, such as the Internet. The modem 354, which may be internal or external, is connected to the system bus 323 via the serial port interface 346. In a networked environment, program modules depicted relative to the computer 320, or portions thereof, may be stored in the remote memory storage device 350. It will be appreciated that the network connections shown are exemplary and other means of establishing a communications link between the computers may be used.

Although the invention has been shown and described with respect to certain implementations, it will be appreciated that equivalent alterations and modifications will occur to others skilled in the art upon the reading and understanding of this specification and the annexed drawings. In particular regard to the various functions performed by the above described components (assemblies, devices, circuits, systems, etc.), the terms (including a reference to a "means") used to describe such components are intended to correspond, unless otherwise indicated, to any component which performs the specified function of the described component (i.e., that is functionally equivalent), even though not structurally equivalent to the disclosed structure, which performs the function in the herein illustrated exemplary applications and implementations of the invention. As used herein, the term "component" may refer to a computer-related entity, such as hardware, a combination of hardware and software, software, or software in execution. For example, a component may be, but is not limited to a process running on a processor, a processor, an object, an executable, a thread of execution, a program and a computer. By way of illustration, both an application running on a server and the server can be a component.

In addition, while a particular feature of the invention may have been disclosed with respect to only one of several aspects or implementations of the invention, such a feature may be combined with one or more other features of the other implementations as may be desired and advantageous for any given or particular application. Furthermore, to the extent that the terms "includes", "including", "has", "having", and variants thereof are used in either the detailed description or the claims, these terms are intended to be inclusive in a manner similar to the term "comprising" and its variants.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims.

What is claimed is:

1. A computer implemented method of determining the location of an Internet host using a computer system, comprising the following computer executable acts:
   obtaining route information relating to one or more network paths between a host IP address associated with the Internet host and the computer system, wherein the network paths comprise the computer system, the Internet host, and at least one intermediate network node, and wherein the route information comprises a plurality of router labels associated with the host IP address and the at least one intermediate network node;
   extracting one or more location codes from the route information corresponding to a router label associated with one of the Internet host and one or more intermediate network nodes proximate the Internet host;
   consulting a data store comprising at least one data set having location codes and corresponding location information;
   obtaining location information from the data store corresponding to the one or more location codes associated with the one of the Internet host and the one or more intermediate network nodes proximate the Internet host;
   providing a location estimate of the location of the Internet host according to the location information from the data store corresponding to the location code;
   determining a dispersion metric representative of the accuracy of the location estimate of the location of the Internet host and selectively providing the location estimate; and
   selectively correcting the location estimate according to the dispersion metric.

2. The method of claim 1, further comprising extracting the location code by examining the router labels in route order along the path from the host to the computer system until a location code is found that is usable to obtain location information from the data store.

3. The method of claim 2, further comprising:
   determining a confidence metric representative of the accuracy of the location estimate; and
   selectively providing the location estimate of the location of the Internet host if the confidence metric exceeds a threshold.

4. The method of claim 3, further comprising:
   determining a confidence metric representative of the accuracy of the location estimate based upon the delay time between the Internet host and the network node associated with the location estimate.

5. The method of claim 1, further comprising:
   obtaining route information relating to each network path between the host IP address and each of a plurality of computer systems, wherein the route information comprises a plurality of router labels associated with the host IP address, and each of the plurality of computer systems, and at least one intermediate network node in each network path;
   extracting a location code for each network path from the route information corresponding to a router label associated with one of the Internet host and the at least one intermediate network node in each network path;
   obtaining location information from the data store corresponding to each location code;
   providing a plurality of location estimates of the location of the Internet host according to the location information from the data store corresponding to each location code; and
   correlating at least two of the location estimates to provide an improved location estimate of the location of the Internet host.

6. The method of claim 1, wherein the location code comprises one of a city code, and airport code, and a country code, and wherein obtaining the route information comprises using a traceroute tool.

7. A software tool stored on a computer readable storage medium for determining the location of an Internet host using a computer system, comprising the following computer executable components:
   a route trace component that obtains route information relating to one or more network paths between a host IP address associated with the Internet host and the computer system, wherein first network paths comprises the computer system, the Internet host, and at least one intermediate network node, and wherein the route information comprises a plurality of router labels associated with the host IP address and the at least one intermediate network node;
   an extraction component that extracts one or more location codes from the route information corresponding to one or more router labels associated with one of the Internet host and the at least one intermediate network node proximate the Internet host;
   a data store comprising at least one data set having location codes and corresponding location information;
   an estimation component that obtains location information from the data store corresponding to the location codes associated with the one of the Internet host and the at least one intermediate network node proximate the Internet host, and to provide a location estimate of the location of the Internet host according to the location information from the data store corresponding to the location code;
   a correction component that determines a dispersion metric representative of the accuracy of the location estimate of the location of the Internet host and selectively correcting the location estimate according to the dispersion metric, wherein the location estimate is at least one of stored on a computer readable storage medium or displayed on an display device.

8. A computer-readable medium having computer-executable instructions for:
   obtaining route information relating to one or more network paths between a host IP address associated with an Internet host and a computer system, wherein the network paths comprise the computer system, the Internet host, and at least one intermediate network node, and wherein the route information comprises a plurality of router labels associated with the host IP address and the at least one intermediate network node;

extracting one or more location codes from the route information corresponding to a router label associated with one of the Internet host and one or more intermediate network nodes proximate the Internet host;

consulting a data store comprising at least one data set having location codes and corresponding location information;

obtaining location information from the data store corresponding to the location codes associated with the one of the Internet host and the one or more intermediate network nodes proximate the Internet host;

providing a location estimate of the location of the Internet host according to the location information from the data store corresponding to the location code;

determining a dispersion metric representative of the accuracy of the location estimate of the location of the Internet host; and selectively correcting the location estimate according to the dispersion metric.

9. A system executing on one or more processors for determining the location of an Internet host, comprising the following computer executable components:

a first component operating in a computer system that obtains route information relating to one or more network paths between a host IP address associated with the Internet host and the computer system, wherein the network paths comprises the computer system, the Internet host, and at least one intermediate network node, and wherein the route information comprises a plurality of router labels associated with the host IP address and the at least one intermediate network node;

a second component operating in the computer system that extracts one or more location codes from the route information corresponding to a router label associated with one of the Internet host and one or more intermediate network nodes proximate the Internet host;

a third component operating in the computer system that consults a data store comprising at least one data set having location codes and corresponding location information;

a fourth component operating in the computer system to obtain location information from the data store corresponding to the location codes associated with the one of the Internet host and the one or more intermediate network nodes proximate the Internet host;

a fifth component operating in the computer system that determines a location estimate of the location of the Internet host according to the location information from the data store corresponding to the location code; and a sixth component operating in the computer system that determines a dispersion metric representative of the accuracy of the location estimate of the location of the internet host and selectively provide the location estimate according to dispersion metric.

10. Geographical location estimate data associated with an Internet host, the estimate data resulting from a process executing on a computer system, comprising the following computer executable acts:

obtaining route information relating to one or more network paths between a host IP address associated with the Internet host and a computer system, wherein the network paths comprise the computer system, the Internet host, and at least one intermediate network node, and wherein the route information comprises a plurality of router labels associated with the host IP address and the at least one intermediate network node;

extracting one or more location codes from the route information corresponding to a router label associated with one of the Internet host and one or more intermediate network nodes proximate the Internet host;

consulting a data store comprising at least one data set having location codes and corresponding location information;

obtaining location information from the data store corresponding to the one or more location codes associated with the one of the Internet host and the one or more intermediate network nodes proximate the Internet host; and providing a location estimate of the location of the Internet host according to the location information from the data store corresponding to the location code;

determining a dispersion metric representative of the accuracy of the location estimate of the location of the Internet host; and selectively correcting the location estimate according to the dispersion metric, wherein the location estimate is at least one of stored on a computer readable storage medium or displayed on an display device.

11. A computer implemented method of determining the location of an Internet host using multiple computer systems, comprising the following computer executable acts:

obtaining route information relating to a plurality of network paths between a host IP address associated with the Internet host and a corresponding plurality of computer systems, respectively, wherein the plurality of network paths individually comprise a corresponding computer system, the Internet host, and at least one intermediate network node, and wherein the route information comprises a plurality of router labels associated with the host IP address and an intermediate network node;

extracting one or more location codes from the route information corresponding to a router label associated with one of the Internet host and one or more intermediate network nodes proximate the Internet host;

consulting a data store comprising at least one data set having location codes and corresponding location information;

obtaining location information from the data store corresponding to the one or more location codes associated with the one of the Internet host and the one or more intermediate network nodes proximate the Internet host;

providing a location estimate of the location of the Internet host according to the location information;

determining a dispersion metric representative of the accuracy of the location estimate of the location of the Internet host; and selectively correcting the location estimate according to the dispersion metric.

12. A computer implemented method of determining the location of an Internet host using a first computer system, comprising the following computer executable acts:

measuring a first delay time relating to a transmission from the first computer system to receipt of the transmission at the Internet host along a first network path between a host IP address associated with the Internet host and the first computer system;

measuring a second delay time relating to a transmission from a second computer system to receipt of the transmission at the Internet host along a second network path between the host IP address and the second computer system;

measuring a third delay time relating to a transmission from a third computer system to receipt of the transmission at the Internet host along a third network path between the host IP address and the third computer system, at least one of the first, second, and third network paths containing at least one intermediate node;

correlating the first, second, and third delay times; and providing a location estimate of the location of the Internet host according to the correlation of the first, second, and third delay times; and computing a dispersion metric representative of the accuracy of the location estimate of the location of the Internet host and selectively providing the location estimate based upon the dispersion metric, wherein the location estimate is at least one of stored on a computer readable storage medium or displayed on an display device.

13. The method of claim 12, wherein correlating the first, second, and third delay times comprises triangulating the first, second, and third delay measurements.

14. The method of claim 12, wherein correlating the first, second, and third delay times comprises:

consulting a data store comprising N sets of first, second, and third delay measurements between the first, second, and third computer systems, respectively, and N known hosts, as well as location information associated with the N known hosts, wherein N is an integer;

performing a comparison of the first, second, and third delay times with the N sets of first, second, and third delay measurements in the data store;

determining a nearest set of first, second, and third delay measurements according to the comparison; and providing a location estimate of the Internet host according to the nearest set of first, second, and third delay measurements.

15. The method of claim 14, wherein performing the comparison of the first, second, and third delay times with the N sets of first, second, and third delay measurements in the data store comprises determining N Euclidian distances corresponding to the Euclidian distances between the N sets of first, second, and third delay measurements in the data store and the first, second, and third delay times, and wherein providing a location estimate of the Internet host according to the nearest set of first, second, and third delay measurements comprises selecting location information associated with the set of first, second, and third delay measurements in the data store associated with the smallest Euclidian distance as the location estimate.

16. The method of claim 12, wherein correlating the first, second, and third delay times comprises:

computing a first probability density function establishing a relationship between a first network delay associated with the first computer system and a first distance from the first computer system;

determining a first distance estimate representative of the distance between the first computer system and the location of the Internet host using the first delay time and the first probability density function;

computing a second probability density function establishing a relationship between a second network delay associated with the second computer system and a second distance from the second computer system;

determining a second distance estimate representative of the distance between the second computer system and the location of the Internet host using the second delay time and the second probability density function;

computing a third probability density function establishing a relationship between a third network delay associated with the third computer system and a third distance from the third computer system; and determining a third distance estimate representative of the distance between the third computer system and the location of the Internet host using the third delay time and the third probability density function;

and wherein providing the location estimate comprises triangulating the first, second, and third distance estimates.

17. The method of claim 16, wherein determining the first, second, and third distance estimates further comprises computing an error function over a location space, and determining coordinates within the location space where the error function is minimized.

18. The method of claim 17, wherein determining coordinates within the location space where the error function is minimized comprises minimizing the error function across a list of known city locations, and wherein providing the location estimate comprises providing the known city location corresponding with the minimum value of the error function.

19. The method of claim 18, wherein computing the error function comprises using a weighted least mean squares algorithm to optimize the location estimate.

20. The method of claim 18, wherein computing the error function comprises using a probability density estimation to optimize the location estimate.

21. The method of claim 18, wherein computing the error function comprises using a weighted least mean squares algorithm to prune a solution space, and using a probability density estimation to optimize the location estimate from the pruned solution space.

22. The method of claim 18, wherein computing the error function comprises using a probability density estimation to prune a solution space, and using a weighted least mean squares algorithm to optimize the location estimate from the pruned solution space.

23. A software tool stored on a computer readable storage medium for determining the location of an Internet host using a first computer system, comprising the following computer executable components:

a first delay component that measures a first delay time relating to a transmission from the first computer system to receipt of the transmission at the Internet host along a first network path between a host IP address associated with the Internet host and the first computer system;

a second delay component that measures a second delay time relating to a transmission from a second computer system to receipt of the transmission at the Internet host along a second network path between the host IP address and the second computer system;

a third delay component that measures a third delay time relating to a transmission from a third computer system to receipt of the transmission at the Internet host along a third network path between the host IP address and the third computer system, at least one of the first, second, and third network paths containing at least one intermediate node;

a correlation component that correlates the first, second, and third delay times;

an estimation component that provides a location estimate of the location of the Internet host according to the correlation of the first, second, and third delay times; and a correction component that computes a dispersion metric representative of the accuracy of the location estimate of the location of the Internet host and selectively provides the location estimate based upon the dispersion metric, wherein the location estimate is at least one of stored on a computer readable storage medium or displayed on an display device.

24. A computer-readable medium having computer-executable instructions for:

measuring a first delay time relating to a transmission from a first computer system to receipt of the transmission at an Internet host along a first network path between a host IP address associated with the Internet host and the first computer system;

measuring a second delay time relating to a transmission from a second computer system to receipt of the transmission at the Internet host along a second network path between the host IP address and the second computer system;

measuring a third delay time relating to a transmission from the Internet host to receipt of the transmission at a third computer system along a third network path between the host IP address associated with the Internet host and a third computer system, at least one of the first, second, and third network paths containing at least one intermediate node;

correlating the first, second, and third delay times;

providing a location estimate of the location of the Internet host according to the correlation of the first, second, and third delay times; and computing a dispersion metric representative of the accuracy of the location estimate of the location of the Internet host and selectively providing the location estimate based upon the dispersion metric, wherein the location estimate is at least one of stored on a computer readable storage medium or displayed on an display device.

25. A computer implemented system for determining the location of an Internet host, comprising the following computer executable components:

a first component operating in a first computer system to measure a first delay time relating to a transmission from the first computer system to receipt of the transmission at the Internet host along a first network path between a host IP address associated with the Internet host and the first computer system;

a second component operating to measure a second delay time relating to a transmission from a second computer system to receipt of the transmission at the Internet host along a second network path between the host IP address and the second computer system;

a third component operating to measure a third delay time relating to a transmission from a third computer system to receipt of the transmission at the Internet host along a third network path between the host IP address and the third computer system, at least one of the first, second, and third network paths containing at least one intermediate node;

a fourth component operating to correlate the first, second, and third delay times; and a fifth component operating in a first computer system to provide a location estimate of the location of the Internet host according to the correlation of the first, second, and third delay times; and a sixth component that computes a dispersion metric representative of the accuracy of the location estimate of the location of the Internet host and selectively provides the location estimate based upon the dispersion metric, wherein the location estimate is at least one of stored on a computer readable storage medium or displayed on an display device.

26. Geographical location estimate data associated with an Internet host, the estimate data resulting from a process executing on a computer system, comprising the following computer executable acts:

measuring a first delay time relating to a transmission from a first computer system to receipt of the transmission at the Internet host along a first network path between a host IP address associated with the Internet host and the first computer system;

measuring a second delay time relating to a transmission from a second computer system to receipt of the transmission at the Internet host along a second network path between the host IP address and the second computer system;

measuring a third delay time relating to a transmission from a third computer system to receipt of the transmission at the Internet host along a third network path between the host IP address and the third computer system, at least one of the first, second, and third network paths containing at least one intermediate node;

correlating the first, second, and third delay times;

providing a location estimate of the location of the Internet host according to the correlation of the first, second, and third delay times; and computing a dispersion metric representative of the accuracy of the location estimate of the location of the Internet host and selectively providing the location estimate based upon the dispersion metric, wherein the location estimate is at least one of stored on a computer readable storage medium or displayed on an display device.

27. A method of determining the location of an Internet host using a first computer system, comprising the following computer executable acts:

obtaining partial IP-to-location mapping information from a data source; obtaining network routing information;

clustering together IP addresses corresponding to hosts in the same geographic location according to network routing information to obtain cluster information;

correlating the partial IP-to-location information with the cluster information;

providing a location estimate of the location of the Internet host according to the correlation of the partial IP-to-location information and the cluster information; and computing a dispersion metric representative of the accuracy of the location estimate of the location of the Internet host and selectively providing the location estimate based upon the dispersion metric.

28. The method of claim 27, wherein obtaining network routing information comprises using a routing protocol.

29. The method of claim 28, wherein the routing protocol is one of BGP, RIP, OSPF, IGRP, and EGP.

30. The method of claim 27, wherein clustering together IP addresses corresponding to hosts in the same geographic location according to network routing information to obtain cluster information comprises associating an address prefix used by a routing protocol with a geographical location.

31. The method of claim 30, further comprising:
sub-dividing the geographical location associated with the address prefix into at least two clusters according to a geographical spread associated with the geographical location.

32. The method of claim 27, further comprising sub-dividing the cluster information according to a geographical spread associated with the geographical location.

33. The method of claim 27, further comprising selectively providing the location estimate if the dispersion metric is less than a threshold value.

34. The method of claim 33, further comprising a threshold value that is dependent on the size of the cluster.

35. The method of claim 27, further comprising:
obtaining route information relating to a first network path between a host IP address associated with the Internet host and the first computer system, wherein the first network path comprises the first computer system, the Internet host, and at least one intermediate network node, and wherein the route information comprises a plurality of router labels associated with the host IP address and the at least one intermediate network node;
extracting a first location code from the route information corresponding to a router label associated with one of the Internet host and an intermediate network node proximate the Internet host;
consulting a data store comprising at least one data set having location codes and corresponding location information;
obtaining first location information from the data store corresponding to the first location code associated with the one of the Internet host and the intermediate network node proximate the Internet host; and
providing a first location estimate of the location of the Internet host according to the first location information from the data store corresponding to the first location code.

36. The method of claim 35, further comprising:
measuring a first delay time relating to a transmission from the first computer system to receipt of the transmission at the Internet host along a first network path between a host IP address associated with the Internet host and the first computer system;
measuring a second delay time relating to a transmission from a second computer system to receipt of the transmission at the Internet host along a second network path between the host IP address and the second computer system;
measuring a third delay time relating to a transmission from a third computer system to receipt of the transmission at the Internet host along a third network path between the host IP address and the third computer system, at least one of the first, second, and third network paths containing at least one intermediate node;
correlating the first, second, and third delay times; and
providing a location estimate of the location of the Internet host according to the correlation of the first, second, and third delay times.

37. The method of claim 27, further comprising:
measuring a first delay time relating to a transmission from the first computer system to receipt of the transmission at the Internet host along a first network path between a host IP address associated with the Internet host and the first computer system;
measuring a second delay time relating to a transmission from a second computer system to receipt of the transmission at the Internet host along a second network path between the host IP address and the second computer system;
measuring a third delay time relating to a transmission from a third computer system to receipt of the transmission at the Internet host along a third network path between the host IP address and the third computer system, at least one of the first, second, and third network paths containing at least one intermediate node;
correlating the first, second, and third delay times; and
providing a location estimate of the location of the Internet host according to the correlation of the first, second, and third delay times.

38. A software tool stored on a computer readable storage medium for determining the location of an Internet host using a first computer system, comprising the following computer executable components:
a first component that obtains partial IP-to-location mapping information from a data source;
a routing protocol component that obtains network routing information;
a clustering component that clusters together IP addresses corresponding to hosts in the same geographic location according to network routing information to obtain cluster information;
a correlation component that correlates the partial IP-to-location information with the cluster information;
an estimation component that provides a location estimate of the location of the Internet host according to the correlation of the partial IP-to-location information and the cluster information; and
a correction component that computes a dispersion metric representative of the accuracy of the location estimate of the location of the Internet host and selectively provides the location estimate based upon the dispersion metric, wherein the location estimate is at least one of stored on a computer readable storage medium or displayed on an display device.

39. A computer-readable medium having computer-executable instructions for:
obtaining partial IP-to-location mapping information from a data source; obtaining network routing information;
clustering together IP addresses corresponding to hosts in the same geographic location according to network routing information to obtain cluster information;
correlating the partial IP-to-location information with the cluster information;
providing a location estimate of the location of the Internet host according to the correlation of the partial IP-to-location information and the cluster information; and
calculating a dispersion metric representative of the accuracy of the location estimate of the location of the Internet host and selectively providing the location estimate based upon the dispersion metric.

40. A system executing on one or more processors for determining the location of an Internet host, comprising the following computer executable components:
a first component that obtains partial IP-to-location mapping information from a data source;
a second component that obtains network routing information;

a third component that clusters together IP addresses corresponding to hosts in the same geographic location according to network routing information to obtain cluster information;

a fourth component operating that correlates the partial IP-to-location information with the cluster information;

a fifth component that provides a location estimate of the location of the Internet host according to the correlation of the partial IP-to-location information and the cluster information; and a sixth component operating to that calculates a dispersion metric representative of the accuracy of the location estimate of the location of the Internet host and selectively providing the location estimate based upon the dispersion metric.

41. Geographical location estimate data associated with an Internet host, the estimate data resulting from a process executing on a computer system, comprising the following computer executable acts:

obtaining partial IP-to-location mapping information from a data source;

obtaining network routing information;

clustering together IP addresses corresponding to hosts in the same geographic location according to network routing information to obtain cluster information;

correlating the partial IP-to-location information with the cluster information; providing a location estimate of the location of the Internet host according to the correlation of the partial IP-to-location information and the cluster information; and computing a dispersion metric representative of the accuracy of the location estimate of the location of the Internet host and selectively providing the location estimate based upon the dispersion metric, wherein the location estimate is at least one of stored on a computer readable storage medium or displayed on an display device.

* * * * *